(12) United States Patent
Theofanopoulos et al.

(10) Patent No.: US 11,973,274 B2
(45) Date of Patent: Apr. 30, 2024

(54) SINGLE-SWITCH-PER-BIT TOPOLOGY FOR RECONFIGURABLE REFLECTIVE SURFACES

(71) Applicants: Panagiotis Theofanopoulos, Tempe, AZ (US); Georgios Trichopoulos, Tempe, AZ (US)

(72) Inventors: Panagiotis Theofanopoulos, Tempe, AZ (US); Georgios Trichopoulos, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 412 days.

(21) Appl. No.: 17/323,560

(22) Filed: May 18, 2021

(65) Prior Publication Data
US 2021/0359408 A1    Nov. 18, 2021

Related U.S. Application Data

(60) Provisional application No. 63/026,426, filed on May 18, 2020.

(51) Int. Cl.
*H01Q 3/36* (2006.01)
*H01Q 1/50* (2006.01)
(Continued)

(52) U.S. Cl.
CPC ............. *H01Q 3/247* (2013.01); *H01Q 1/50* (2013.01); *H01Q 3/36* (2013.01); *H04B 1/44* (2013.01)

(58) Field of Classification Search
CPC ............ H01Q 3/247; H01Q 1/50; H01Q 3/36; H01Q 3/38; H01Q 3/46; H01Q 9/045; H01Q 21/065; H04B 1/44
See application file for complete search history.

(56) References Cited

U.S. PATENT DOCUMENTS 4,053,895 A * 10/1977 Malagisi ............... H01Q 3/247
                                                           342/374
5,440,320 A *  8/1995 Lach ..................... H01Q 15/147
                                                           343/915
(Continued)

OTHER PUBLICATIONS

Freeman et al., "Optoelectronically Reconfigurable Monopole Antenna", Electronics Letters Jul. 30, 1992 vol. 28 No. 16 (Year: 1992).*
(Continued)

*Primary Examiner* — Hai V Tran
*Assistant Examiner* — Bamidele A Immanuel
(74) *Attorney, Agent, or Firm* — Withrow & Terranova, P.L.L.C.

(57) ABSTRACT

A single-switch-per-bit topology for reconfigurable reflective surfaces (RRSs) is provided. Novel multi-bit unit-cell configurations are presented for radio-frequency (RF) RRSs with improved radiation efficiency and compact designs. Embodiments described herein realize a multi-bit RRS using an antenna array with multiple integrated switches at the ports of every antenna element (e.g., one at each port, providing one control bit per switch). By manipulating the states of the switches, the impinging waves on the surface are modulated, leading to beamforming in the desired direction. Some embodiments utilize a single switch-per-bit topology integrating single-pole-single-throw (SPST) switches (e.g., PIN diodes) into the unit-cell design, achieving up to 4 bits of phase quantization with only 4 switches. The exhibited radiation efficiency of the multi-bit RRS is significantly improved compared to lower bit configurations.

15 Claims, 17 Drawing Sheets

(51) Int. Cl.
H01Q 3/24 (2006.01)
H04B 1/44 (2006.01)

(56) References Cited

U.S. PATENT DOCUMENTS

| | | | | |
|---|---|---|---|---|
| 6,999,044 B2* | 2/2006 | Durham | ............... | H01Q 3/2658 343/756 |
| 7,030,824 B1* | 4/2006 | Taft | ............... | H01Q 3/46 342/368 |
| 2006/0109066 A1* | 5/2006 | Borysenko | ............... | H01P 1/185 333/164 |
| 2009/0009391 A1* | 1/2009 | Fox | ............... | H01Q 21/0018 342/372 |
| 2018/0006014 A1* | 1/2018 | Mayer | ............... | H05K 1/0259 |
| 2021/0280972 A1* | 9/2021 | Behdad | ............... | H01Q 3/46 |

OTHER PUBLICATIONS

Ji et al., "A Reconfigurable Partially Reflective Surface (PRS) Antenna for Beam Steering", IEEE Transactions on Antennas and Propagation, vol. 63, No. 6, Jun. 2015.*

Rodrigo et al., "Unit Cell for Frequency-Tunable Beamscanning Reflectarrays", IEEE Transactions on Antennas and Propagation, vol. 61, No. 12, Dec. 2013.*

Kayabasi et al., "Triangular quad-port multi-polarized Uwb Mimo antenna with enhanced isolation using neutralization ring", Int. J. Electron. Commun. (AEÜ) 85 (2018) 47-53 (Year: 2018).*

Huang et al., "Dynamical beam manipulation based on 2-bit digitally-controlled coding metasurface", State Key Laboratory of Optical Technologies on Nano-Fabrication and Micro-Engineering, Institute of Optics and Electronics, (Year: 2016).*

Khalily et al., "Design of Phased Arrays of Series-Fed Patch Antennas With Reduced Number of the Controllers for 28-GHz mm-Wave Applications", IEEE Antennas and Wireless Propagation Letters, vol. 15, (Year: 2016).*

Carrasco, E. et al., "Reflectarray antennas: A review," Forum for Electromagnetic Research Methods and Application Technologies (FERMAT), vol. 16, Aug. 2016, 16 pages.

Costanzo, S. et al., "Dual-Layer Single-Varactor Driven Reflectarray Cell for Broad-Band Beam-Steering and Frequency Tunable Applications," IEEE Access, vol. 6, Nov. 19, 2018, IEEE, pp. 71793-71800.

Dai, L. et al., "Reconfigurable Intelligent Surface-Based Wireless Communications: Antenna Design, Prototyping, and Experimental Results," IEEE Access, vol. 8, Mar. 2, 2020, IEEE, pp. 45913-45923.

Han, Y. et al., "Large Intelligent Surface-Assisted Wireless Communication Exploiting Statistical CSI," IEEE Transactions on Vehicular Technology, vol. 68, No. 8, Aug. 2019, pp. 8238-8242.

Hillman, C. et al., "Scaleable Vanadium Dioxide Switches with Submillimeterwave Bandwidth:VO2 switches with improved RF bandwidth and power handling," 2017 IEEE Compound Semiconductor Integrated Circuit Symposium (CSICS), Oct. 22-25, 2017, IEEE, 4 pages.

Huang, C. et al., "Dynamical beam manipulation based on 2-bit digitally-controlled coding metasurface," Scientific Reports, vol. 7, Feb. 8, 2017, 8 pages.

Juang, C. et al., "Reconfigurable Intelligent Surfaces for Energy Efficiency in Wireless Communication," IEEE Transactions on Wireless Communications, vol. 18, No. 8, Aug. 2019, IEEE, pp. 4157-4170.

Huang, J. et al., "Reflectarray Antennas," Piscataway, NJ, USA: IEEE Press, Hoboken, NJ, USA: Wiley, 2008, 233 pages.

Hum, S. et al., "Reconfigurable Reflectarrays and Array Lenses for Dynamic Antenna Beam Control: A Review," IEEE Transactions on Antennas and Propagation, vol. 62, No. 1, Jan. 2014, IEEE, pp. 183-198.

Kamoda, H. et al., "60-GHz Electronically Reconfigurable Large Reflectarray Using Single-Bit Phase Shifters," IEEE Transactions on Antennas and Propagation, vol. 59, No. 7, Jul. 2011, IEEE, pp. 2524-2531.

Kim, M. et al., "Towards mm-wave nanoelectronics and RF switches using MoS22D Semiconductor," 2018 IEEE/MTT-S International Microwave Symposium—IMS, Jun. 2018, pp. 352-354.

Li, L. et al., "Machine-learning reprogrammable metasurface imager," Nature Communications, vol. 10, No. 1, Mar. 2019, Springer Nature, 9 pages.

Liu, S. et al., "Concepts, Working Principles, and Applications of Coding and Programmable Metamaterials," Advanced Optical Materials, vol. 5, No. 22, Sep. 2017, Wiley-VCH, 27 pages.

Merola, C. et al., "Massive MIMO Beamforming on a Chip," 2019 IEEE International Symposium on Antennas and Propagation and USNC-URSI Radio Science Meeting, Jul. 7-12, 2019, Atlanta, GA, USA, pp. 1477-1478.

Nayeri, P. et al., "Beam-Scanning Reflectarray Antennas: A technical overview and state of the art," IEEE Antennas and Propagation Magazine, vol. 57, No. 4, Aug. 2015, IEEE, pp. 32-47.

Rodrigo, D. et al., "Unit Cell for Frequency-tunable Beamscanning Reflectarrays," IEEE Transactions on Antennas and Propagation, vol. 61, No. 12, Dec. 2013, IEEE, pp. 5992-5999.

Rodriguez-Zamudio, J. et al., "Reconfigurable reflectarrays based on optimized spiraphase-type elements," IEEE Transactions on Antennas and Propagation, vol. 60, No. 4, Apr. 2012, IEEE, pp. 1821-1830.

Shivan, T. et al., "220-325 GHz high-isolation SPDT switch in InP DHBT technology," Electronics Letters, vol. 54, No. 21, Oct. 2018, pp. 1222-1224.

Theofanopoulos, P. et al., "On-Wafer Graphene Devices for THz Applications Using a High-Yield Fabrication Process," 2019 IEEE MTT-S International Microwave Symposium (IMS), Jun. 2-7, 2019, Boston, MA, USA, pp. 1107-1110.

Theofanopoulos, P. et al., "Toward Large-Scale Dynamically Reconfigurable Apertures Using Graphene," 2019 IEEE International Symposium on Antennas and Propagation and USNC-URSI Radio Science Meeting, Jul. 7-12, 2019, Atlanta, GA, USA, pp. 511-512.

Thome, F. et al., "Highly Isolating and Broadband Single-Pole Double-Throw Switches for Millimeter-Wave Applications Up to 330 GHz," IEEE Transactions on Microwave Theory and Techniques, vol. 66, No. 4, Apr. 2018, IEEE, pp. 1998-2009.

Wu, Q. et al., "Intelligent Reflecting Surface Enhanced Wireless Network: Joint Active and Passive Beamforming Design," 2018 IEEE Global Communications Conference (GLOBECOM), Dec. 9-13, 2018, Abu Dhabi, UAE, 6 pages.

Yang, H. et al., "A Study of Phase Quantization Effects for Reconfigurable Reflectarray Antennas," IEEE Antennas and Wireless Propagation Letters, vol. 16, May 27, 2016, IEEE, pp. 302-305.

Zhang, X. et al., "2-Bit Programmable Digital Metasurface for Controlling Electromagnetic Wave," 2017 Sixth Asia-Pacific Conference on Antennas and Propagation (APCAP), Oct. 16-19, 2017, Xi'an, China, IEEE, 3 pages.

* cited by examiner

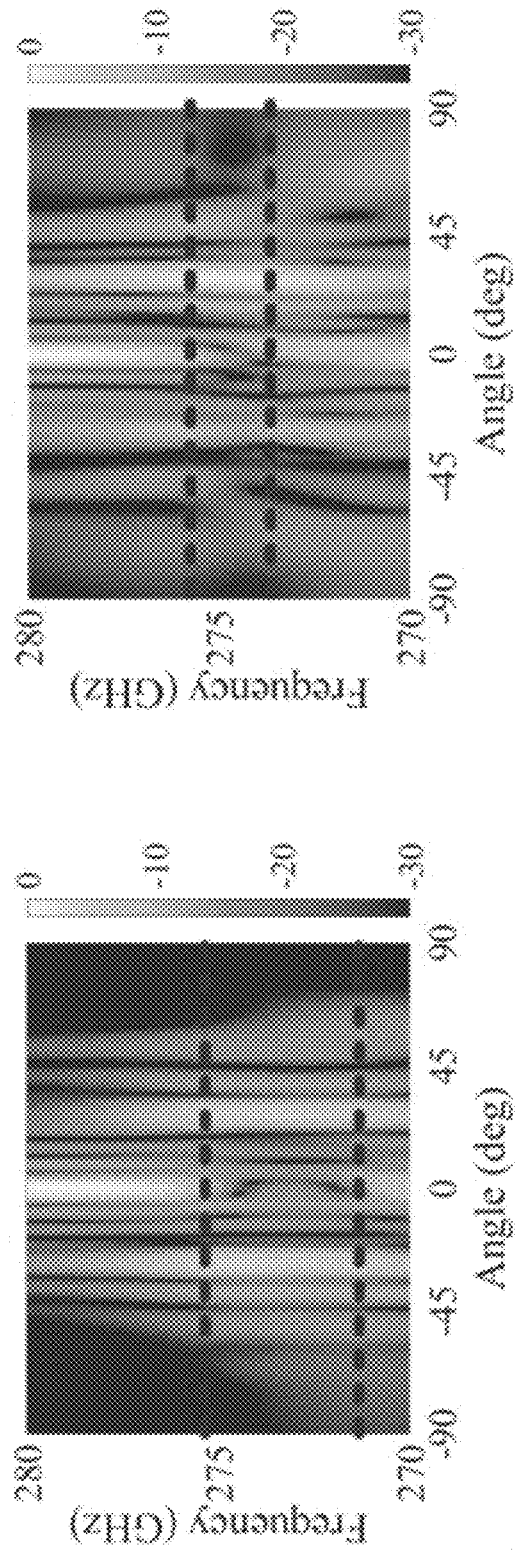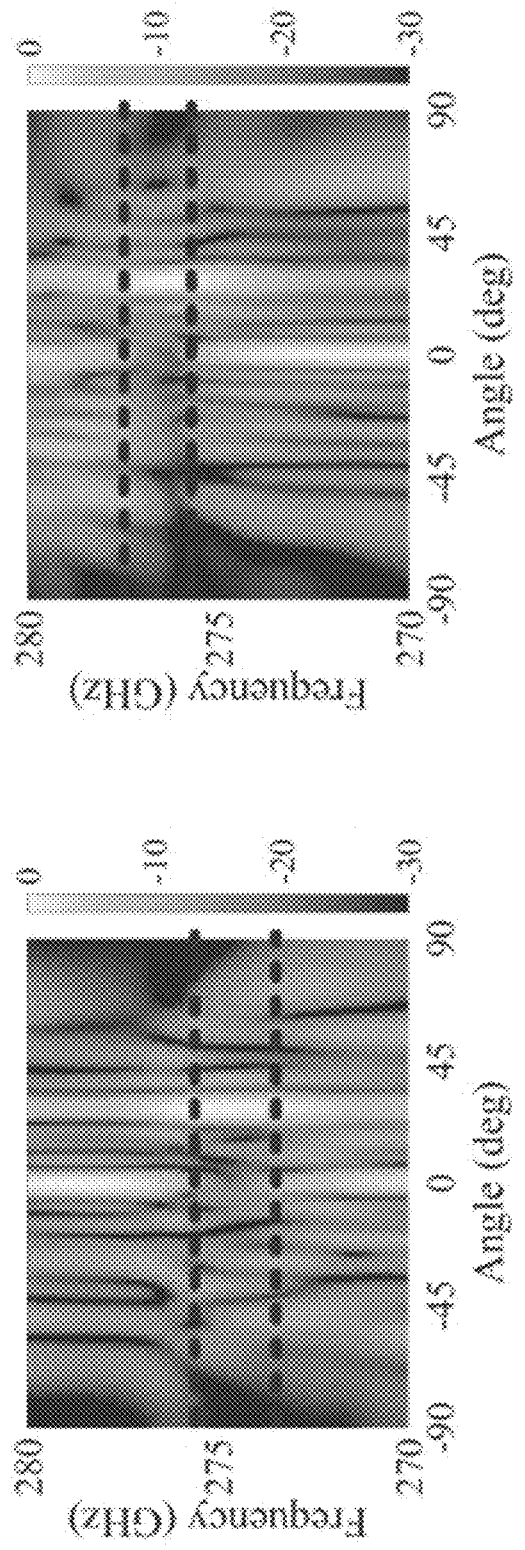

SINGLE-SWITCH-PER-BIT TOPOLOGY FOR RECONFIGURABLE REFLECTIVE SURFACES

RELATED APPLICATIONS

This application claims the benefit of provisional patent application Ser. No. 63/026,426, filed May 18, 2020, the disclosure of which is hereby incorporated herein by reference in its entirety.

GOVERNMENT SUPPORT

This invention was made with government support under 1847138 awarded by the National Science Foundation. The government has certain rights in the invention.

FIELD OF THE DISCLOSURE

The present disclosure relates to beam steering antenna systems such as may be used for radar imaging and radio frequency (RF) communications.

BACKGROUND

Beam reconfiguration is a cornerstone of modern antenna systems and an enabler for a plethora of applications including fifth generation (5G) and beyond communications and security/biomedical imaging. These applications typically require large apertures to form narrow steerable beams that increase signal strength and spatial selectivity for wireless communication applications, and spatial resolution for imaging purposes. Typically, beam steering antenna systems are classified in four categories: 1) analog phased arrays, where beam reconfiguration is achieved through a corporate feeding mechanism (analog beamforming), 2) multiple-input-multiple-output (MIMO) arrays, where beam reconfiguration is carried out in the post-processing domain (digital beamforming), 3) quasi-optical systems, where beam steering is performed by the incorporated optical components (lenses, mirrors, etc.), and 4) reconfigurable reflective surfaces (RRSs) (reflectarrays, metasurfaces, etc.), where beam reconfiguration is realized by modulating the surface electromagnetic properties of the structure (e.g., surface impedance/reflection phase), thus steering the impinging waves to the desired direction.

Analog and digital beamforming systems have been widely utilized in microwave frequencies (up to 30 gigahertz (GHz)) since they offer excellent beam steering performance and many incorporated components are available off-the-shelf (mixers, amplifiers, digital-to-analog converters, switches, filters, phase shifters, etc.). However, in millimeter wave (mmWave)/terahertz (THz) bands (above 30 GHz), these components should be custom designed and monolithically integrated into the system, increasing fabrication cost, design complexity, and losses, leading to inefficient designs in terms of direct current (DC) power consumption and radio frequency (RF) losses for large apertures with hundreds or even thousands of integrated antennas/channels.

However, large aperture RRSs (e.g., consisting of hundreds or even thousands of tunable antenna elements) exhibit reduced RF-front-end complexity and fewer losses compared to phased arrays (analog or digital). Specifically, these surfaces consist of antennas with incorporated switches, which are electrically controlled by a biasing circuitry (e.g., PIN diodes, varactors, etc.). Moreover, the illumination source is typically a single/multi-channel antenna placed outside the surface (e.g., a horn antenna), thus avoiding the use of a complex feeding network with multiple integrated RF components (e.g., couplers, phase shifters, power dividers/combiners, etc.).

FIG. 1A is a schematic diagram of a traditional RRS, where a tunable reflective switch is attached at each antenna of a reflectarray to introduce a phase modulation at the reflected waves. Reconfiguration of the RRS is achieved by manipulating the state of the tunable reflective switches, thus modulating the phase of the reflected waves and steering the beams in the desired directions. Such RRSs can be leveraged in high-spatial-resolution radar imaging systems and/or wireless communication relays improving channel capacity in mmWave (e.g., 5G and beyond) applications.

RRSs typically utilize single-bit phase modulation on the reflected waves, thus lowering beamforming performance (aperture efficiency) due to quantization errors. As such, switches (e.g., PIN diodes) are integrated with the antenna elements and by manipulating their states (e.g., forward-ON/reverse-OFF bias), the phase of the impinging waves is modulated leading to reconfigurable beamforming. To steer the waves toward the desired direction, a unique phase profile is required on the surface, and the reflection phases of each antenna element are continuously located within the $[-\pi, \pi]$ region. However, in realized surfaces only a few phase bits are available (e.g., 1-bit—the phase can only take the values $\pi$ and 0) due to hardware limitations. Thus, the errors caused during the phase quantization process lead to reduced aperture efficiency, coarse beam steering, and higher side lobes. These drawbacks can be alleviated by using multi-bit configurations with finer phase quantization.

Such configurations are realized either by integrating multi-state tunable switches (e.g., varactors) on the antennas, or by incorporating multiple single-pole-single-throw (SPST) switches (e.g., PIN diodes) in the unit-cell design, as shown in FIG. 1A. The first approach is non-realistic in mmWave/THz frequencies since the availability of low-loss tunable switches (e.g., varactors) is limited in the microwave region (up to 30 GHz). Moreover, such tunable switches require high variable voltage, increasing the biasing network complexity. Thus, configurations that integrate multiple SPST switches are preferred, including solid-state switches (e.g., complementary metal-oxide-semiconductor (CMOS), gallium arsenide (GaAs), indium phosphide (InP), etc.) or tunable two-dimensional (2D) materials (e.g., graphene, vanadium-dioxide, etc.). Nevertheless, current multi-bit approaches face several technical challenges that inhibit the much-needed high-resolution phase sampling.

FIGS. 1B and 1C illustrate two traditional approaches to achieving multiple reflection phase bits in reconfigurable surfaces with SPST switches (e.g., PIN diodes). FIG. 1B is a schematic diagram of a unit-cell of the traditional RRS of FIG. 1A implemented using a series configuration. The switches are placed in a series configuration separated by delay lines, and serially activated (ON/OFF) offering different electrical paths for the signals, thus changing the introduced phase delay on the reflected waves. However, in the series configuration, the number of switches is a minimum of $2^B-1$ (where B is the number of bits) and increases exponentially with the number of bits, leading to amplitude modulation (due to the single switch losses added in series), insertion losses, and complex biasing networks.

On the other hand, FIG. 1C is a schematic diagram of a unit-cell of the traditional RRS of FIG. 1A implemented using a shunt configuration. As such, the impinging waves on the antenna are equally split into branches with different delay lines. Then the reflected waves from the branches constructively interfere forming the various phase states of the unit-cell.

FIG. 2A is a schematic diagram of a multi-port antenna model for the shunt configuration. For the shunt configuration, it is assumed that the antenna with the splitter/combiner is a multi-port network that distributes the received signals to the various branches.

FIG. 2B is a schematic diagram of a 2-bit shunt unit-cell topology for the multi-port antenna model of FIG. 2A. In the case of 2-bit modulation, two branches are needed with SPST switches integrated at the end of the branch. Each of the branches with the integrated switch acts as a single-bit modulator; however, if the branches have an electrical length difference of 90° (round trip), the combined signals on the antenna exhibit 4 different phase states depending on the state of the individual switches (ON/OFF), as illustrated in the constellation diagrams of FIGS. 2C-2E.

FIG. 2C is a constellation diagram of a first branch of the 2-bit shunt unit-cell of FIG. 2B. FIG. 2D is a constellation diagram of a second branch of the 2-bit shunt unit-cell of FIG. 2B. FIG. 2E is a constellation diagram of the 2-bit shunt unit-cell of FIG. 2B. Each of the SPST switches provides two states with a phase difference of 90° (FIGS. 2C and 2D), leading to the 4-state constellation diagram in FIG. 2E. In this manner, the shunt approach retains a single switch-per-bit topology, thus keeping the biasing network complexity low, and mitigating amplitude modulation, since the signals are equally split between the identical switches. The main drawback of this configuration is the need for the bulky multi-port splitter/combiner that distributes the signals into the multiple branches. Some attempts to overcome this problem have been made, but none of the existing works achieves a single switch-per-bit topology for multi-bit reconfigurability.

SUMMARY

A single-switch-per-bit topology for reconfigurable reflective surfaces (RRSs) is provided. Novel multi-bit unit-cell configurations are presented for radio-frequency (RF) RRSs with improved radiation efficiency and compact designs. Typically, reflective surfaces use one or multiple single-pole-single-throw (SPST) switches (e.g., PIN diodes) leading to single or dual bit reconfigurable surfaces (e.g., reflectarray antennas). However, existing topologies require more than one switch-per-bit for more than two bits of quantization (leading to excess losses), more RF components, and complex biasing networks. Moreover, using fewer bits results in higher quantization errors that further decrease radiation efficiency and beam scanning resolution.

Embodiments described herein realize a multi-bit RRS using an antenna array with multiple integrated switches at the ports of every antenna element (e.g., one at each port providing one control bit per switch). By manipulating the states of the switches, the impinging waves on the surface are modulated, leading to beamforming in the desired direction. Some embodiments utilize a single switch-per-bit topology integrating SPST switches (e.g., PIN diodes) into the unit-cell design, achieving up to 4 bits of phase quantization with only 4 switches. The exhibited radiation efficiency of the multi-bit RRS is significantly improved compared to lower bit configurations.

In this manner, the radiation performance of RRSs is significantly improved with up to 4 phase quantization bits (e.g., 16 states) while maintaining low hardware complexity by using only one-switch-per-bit topologies. Embodiments are expected to have particular application in millimeter wave (mmWave) and terahertz (THz) frequencies, among other bands, where multi-element (>100) RRSs are needed but components and packaging are costly (e.g., radar imaging systems, such as automotive radars, and/or wireless communication relays).

An exemplary embodiment provides a reconfigurable reflective antenna device. The reconfigurable reflective antenna device includes an antenna element comprising a first port, a second port, and a third port, wherein the antenna element is configured as a splitter/combiner; a first switch coupled to the first port and configured to provide a first control bit for the antenna element; a second switch coupled to the second port and configured to provide a second control bit for the antenna element; and a third switch coupled to the third port and configured to provide a third control bit for the antenna element.

Another exemplary embodiment provides a multi-bit reconfigurable reflective surface. The multi-bit reconfigurable reflective surface includes an array of unit-cells, each unit-cell comprising: a multi-port antenna element; a plurality of switches, each switch coupled to a port of the multi-port antenna element; and a controller coupled to the array of unit-cells and configured to provide a control signal providing a single control bit per each of the plurality of switches to steer an electromagnetic wave impinging on the multi-port antenna element in each of the array of unit-cells.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 16A is a graphical representation of the E-plane radiation pattern as a function of frequency of the RRS with single-bit unit-cells.

FIG. 16B is a graphical representation of the E-plane radiation pattern as a function of frequency of the RRS with two-bit unit-cells.

FIG. 16C is a graphical representation of the E-plane radiation pattern as a function of frequency of the RRS with three-bit unit-cells.

FIG. 16D is a graphical representation of the E-plane radiation pattern as a function of frequency of the RRS with four-bit unit-cells.

DETAILED DESCRIPTION

Figure 1C:
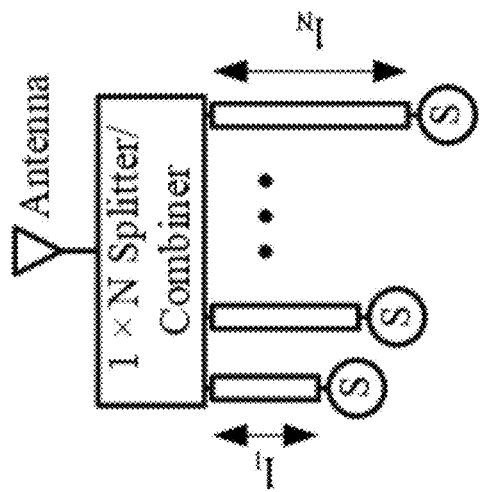
FIG. 1C is a schematic diagram of a unit-cell of the traditional RRS of FIG. 1A implemented using a shunt configuration.
Figure 1B:
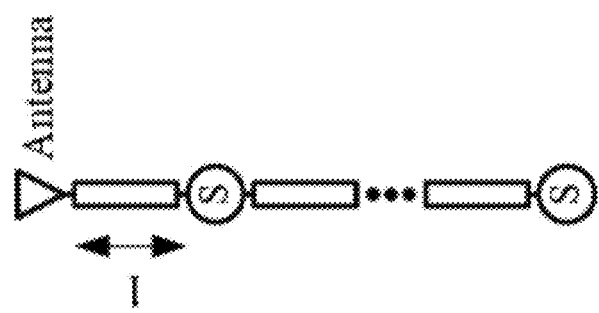
FIG. 1B is a schematic diagram of a unit-cell of the traditional RRS of FIG. 1A implemented using a series configuration.
Figure 1A:
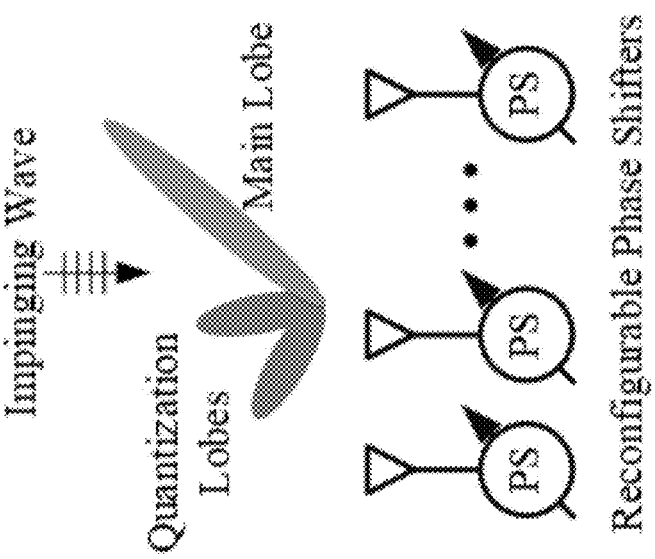
FIG. 1A is a schematic diagram of a traditional reconfigurable reflective surface (RRS), where a tunable reflective switch is attached at each antenna of a reflectarray to introduce a phase modulation at the reflected waves.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A single-switch-per-bit topology for reconfigurable reflective surfaces (RRSs) is provided. Novel multi-bit unit-cell configurations are presented for radio-frequency (RF) RRSs with improved radiation efficiency and compact designs. Typically, reflective surfaces use one or multiple single-pole-single-throw (SPST) switches (e.g., PIN diodes) leading to single or dual bit reconfigurable surfaces (e.g., reflectarray antennas). However, existing topologies require more than one switch-per-bit for more than two bits of quantization (leading to excess losses), more RF components, and complex biasing networks. Moreover, using fewer bits results in higher quantization errors that further decrease radiation efficiency and beam scanning resolution.

Embodiments described herein realize a multi-bit RRS using an antenna array with multiple integrated switches at the ports of every antenna element (e.g., one at each port providing one control bit per switch). By manipulating the states of the switches, the impinging waves on the surface are modulated, leading to beamforming in the desired direction. Some embodiments utilize a single switch-per-bit topology integrating SPST switches (e.g., PIN diodes) into the unit-cell design, achieving up to 4 bits of phase quantization with only 4 switches. The exhibited radiation efficiency of the multi-bit RRS is significantly improved compared to lower bit configurations.

In this manner, the radiation performance of RRSs is significantly improved with up to 4 phase quantization bits (e.g., 16 states) while maintaining low hardware complexity by using only one-switch-per-bit topologies. Embodiments are expected to have particular application in millimeter wave (mmWave) and terahertz (THz) frequencies, among other bands, where multi-element (>100) RRSs are needed but components and packaging are costly (e.g., radar imaging systems, such as automotive radars, and/or wireless communication relays).

I. Introduction

Figure 2B:
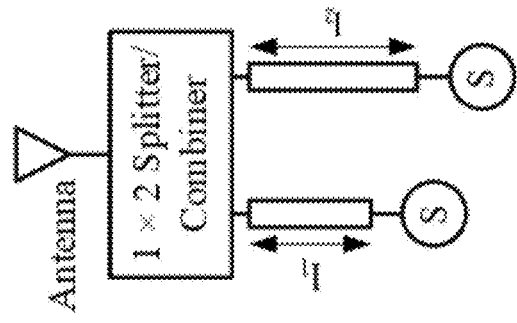
FIG. 2B is a schematic diagram of a 2-bit shunt unit-cell topology for the multi-port antenna model of FIG. 2A.

The presented embodiments implement high-efficiency multi-bit reflective surfaces while retaining the single switch-per-bit constraint for minimum hardware complexity. Namely, the bulky multi-port splitter/combiner of FIGS. 1C and 2B is incorporated into the antenna, thus alleviating the real-estate problems arising in the use of the shunt configuration described above with respect to FIGS. 2A-2E. Embodiments use printed patch antennas, commonly leveraged in mmWave/THz RRSs, and achieve up to 4 bits of phase quantization, with a single switch-per-bit topology.

A cavity model of the printed patch antennas is used to draw multiple feeding lines. When the impinging waves illuminate the surface, the signals on the antennas are split equally among the different ports. Every port is connected to a switch-terminated delay line. By tuning the state of each switch (e.g., biasing), the reflected waves are modulated and constructively added on the antenna. The lengths of the delay lines are appropriately optimized to achieve equispaced phase states (e.g., ideal performance).

Embodiments of the present disclosure achieve up to 4 bits of phase quantization in a low loss design with the use of a single switch-per-bit topology. Such embodiments may be used in a plethora of mmWave/THz imaging and communication applications, including signal relays, and can be extended to other configurations including optical reflective surfaces in the near-infrared and optical frequencies. This could also be extended to reconfigurable transmitting surfaces (RTSs).

Advantages of proposed RRSs with respect to existing alternative RRS topologies include:
- Increased radiation efficiency (less signal loss) due to:
  - Improved beam shaping when using multi-bit phase sampling (e.g., sidelobe levels are reduced).
  - Losses do not scale with a larger number of bits due to the parallel fed topology. This could allow the use of higher insertion loss switches which are typical at millimeter and terahertz frequencies.
  - No need for extra dividers/combiners which increase insertion losses and unit cell footprint (a unit cell is typically confined in an area smaller than $\lambda/2 \times \lambda/2$, where $\lambda$ is a free-space wavelength).
- The superior beam-scanning performance will be attractive in high resolution and high dynamic range radar and imaging applications due to:
- Higher beam scanning resolution.
- Lower side lobes.
- Only one switch-per-bit is required for any multi-bit configuration which allows lower hardware complexity and lower system cost.
- Smaller number of RF switches.
- Smaller number of biasing lines and sources.

Section II discusses the proposed antenna-splitter/combiner design based on a cavity model of patch antennas. In Section III, the multi-bit unit-cell designs are presented alongside a series of results. Then, in Section IV, full-wave results of a 21-element RRS are presented, accompanied by a detailed discussion on the bandwidth constraints of the proposed design. Finally, Section V describes example applications and extensions of the proposed topologies.

II. The Antenna as a Power Divider/Combiner

The main obstacle toward implementing multi-bit RRSs using the shunt topology (FIG. 1C), is the integration of the power splitter/combiner in the limited space of the unit-cell.

Figure 3C:
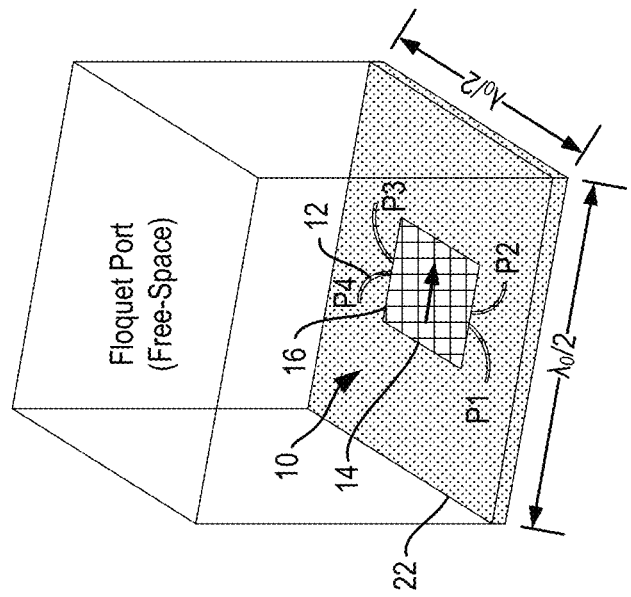
FIG. 3C is a full-wave model of the multiple feed design of FIG. 3B.
Figure 3B:
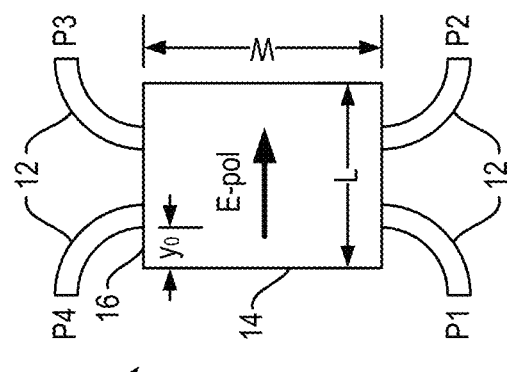
FIG. 3B is a schematic diagram of the antenna element of FIG. 3A illustrating a multiple feed design to equally distribute impinging waves between multiple ports.
Figure 3A:
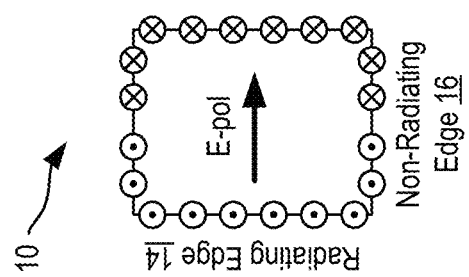
FIG. 3A is an antenna cavity model of an antenna element which acts as a power splitter according to embodiments disclosed herein.

To overcome this bottleneck, embodiments incorporate the splitter/combiner within patch antenna designs as displayed in FIGS. 3A-3C.

FIG. 3A is an antenna cavity model of an antenna element 10 (e.g., a patch antenna) which acts as a power splitter according to embodiments disclosed herein. FIG. 3B is a schematic diagram of the antenna element 10 of FIG. 3A illustrating a multiple feed design to equally distribute impinging waves between multiple ports. FIG. 3C is a full-wave model of the multiple feed design of FIG. 3B.

In this regard, it is assumed that the antenna element 10 (e.g., patch antenna) is a resonating cavity ($TM_{001}$ mode), as illustrated in FIG. 3A. Then four symmetric feeding lines 12 are drawn from the non-radiating edges as shown in FIG. 3B. Each of these feeding lines 12 feeds the same cavity mode ($TM_{001}$), thus when the mode is formed by impinging waves, the signals couple to each of the multiple ports P1, P2, P3, P4 (e.g., 3 or more ports, such as 4 ports). The distance ($y_0$) of the feeding points from a radiating edge 14 impacts the matching and is optimized to achieve equal power splitting between the ports P1, P2, P3, P4.

Figure 4A:
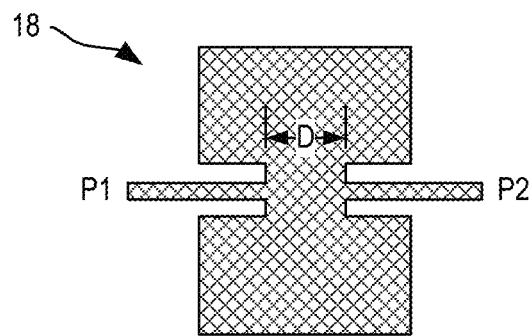
FIG. 4A is a schematic diagram of an inset-fed patch antenna.
Figure 4B:
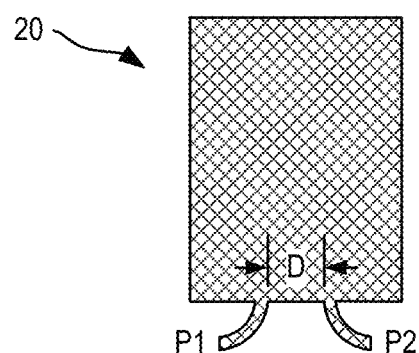
FIG. 4B is a schematic diagram of an edge-fed patch antenna.
Figure 4C:
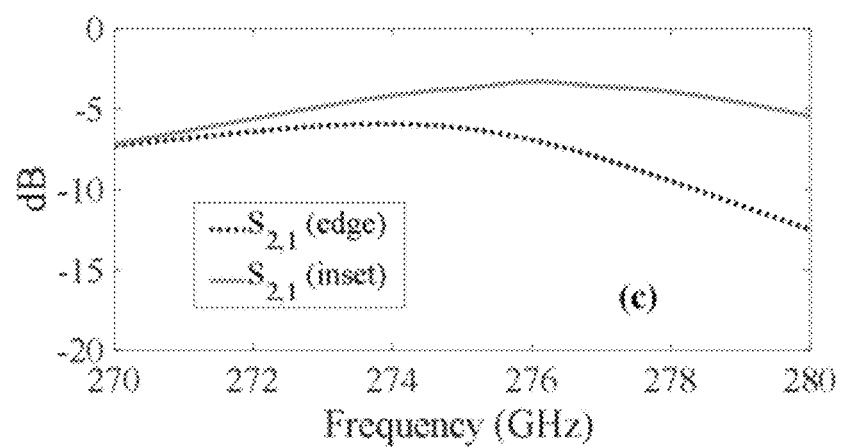
FIG. 4C is a graphical representation of mutual coupling between ports of the inset-fed patch antenna of FIG. 4A and the edge-fed patch antenna of FIG. 4B.

The antenna element 10 is fed from the non-radiating antenna edges 16, instead of inset feeding from the radiating edges 14, to reduce the mutual coupling between the ports as demonstrated in FIGS. 4A-4C.

FIG. 4A is a schematic diagram of an inset-fed patch antenna 18. FIG. 4B is a schematic diagram of an edge-fed patch antenna 20. FIG. 4C is a graphical representation of mutual coupling between ports of the inset-fed patch antenna 18 of FIG. 4A and the edge-fed patch antenna 20 of FIG. 4B. The coupling between the ports P1, P2 is pronounced as the distance between the inset microstrip feeding lines decreases. Moreover, the inset feeding scheme alters the current flow on the top metal of the patch antennas 18 (due to the inset cuts), deteriorating the radiation efficiency, especially in the case of multiple inset feeds.

To evaluate the proposed topology, the antenna-splitter/combiner configuration as shown in FIG. 3C is modeled using an infinite periodic array of $\lambda_0/2$ spacing. As such, a Floquet port is assigned on the upper boundary of the unit-cell and lumped ports are assigned at the edges of the transmission lines, and the signal coupled from the Floquet port (free-space) to the antenna ports P1, P2, P3, P4 is calculated. A substrate 22 used in an exemplary embodiment discussed throughout is silicon ($\varepsilon_r$=11.9 and h=20 microns (µm)) and the design frequency is 275 gigahertz (GHz). All the design parameters are given in Table I.

TABLE I

| Unit-Cell Design Parameters | |
|---|---|
| Variable | Value (µm) |
| W | 215 |
| L | 147 |
| $y_0$ (1-bit) | 50 |
| $y_0$ (2-bit) | 57.5 |
| $y_0$ (3-bit) | 62.5 |
| $y_0$ (4-bit) | 65 |

Figure 5B:
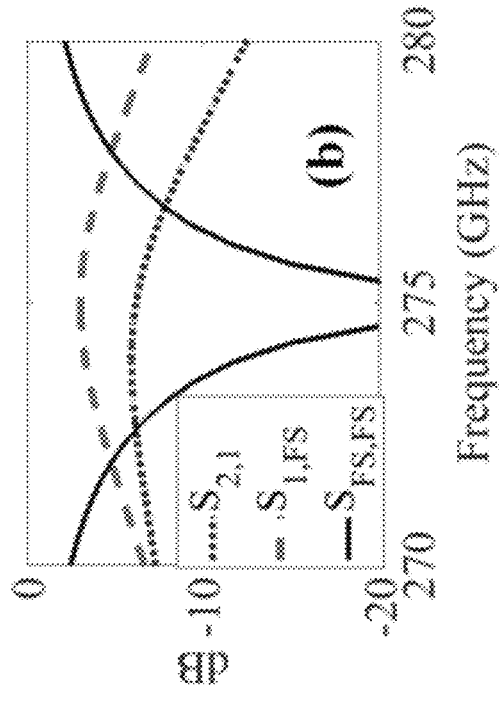
FIG. 5B is a graphical representation of full-wave simulated scattering parameters of the antenna element of FIGS. 3A-3C when two ports are used.
Figure 5D:
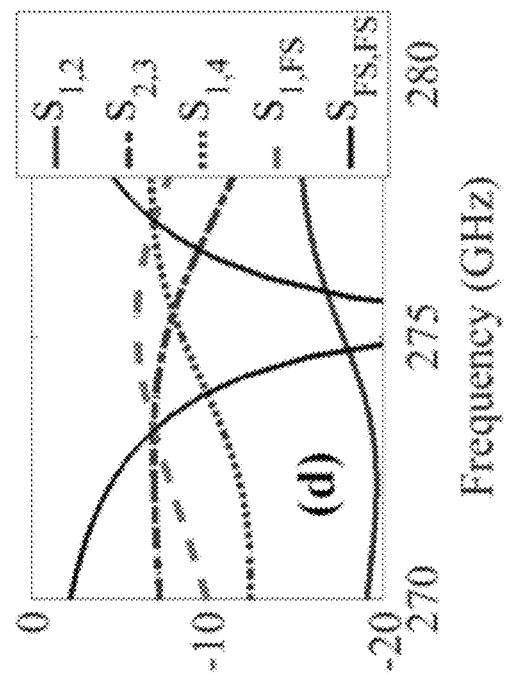
FIG. 5D is a graphical representation of full-wave simulated scattering parameters of the antenna element of FIGS. 3A-3C when four ports are used.
Figure 5A:
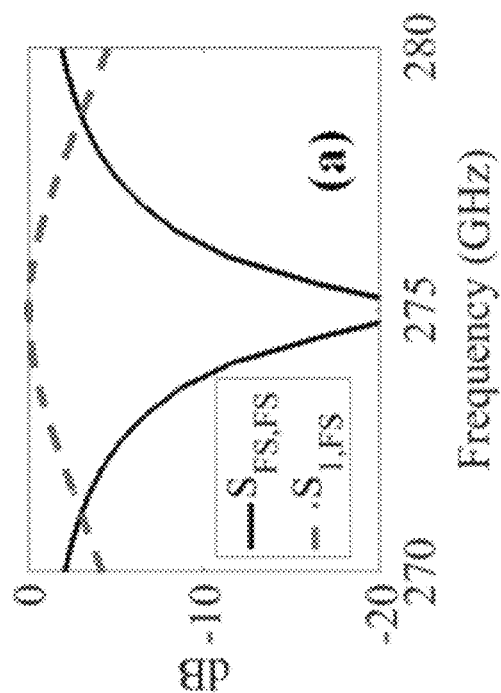
FIG. 5A is a graphical representation of full-wave simulated scattering parameters of the antenna element of FIGS. 3A-3C when a single port is used.
Figure 5C:
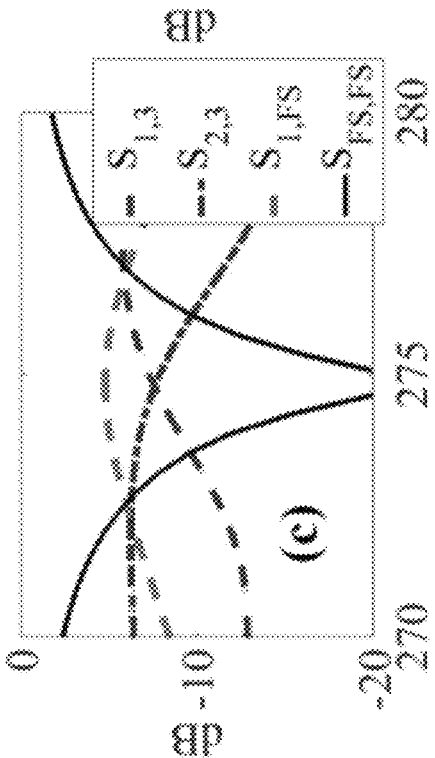
FIG. 5C is a graphical representation of full-wave simulated scattering parameters of the antenna element of FIGS. 3A-3C when three ports are used.

FIG. 5A is a graphical representation of full-wave simulated scattering parameters of the antenna element 10 of FIGS. 3A-3C when a single port is used. FIG. 5B is a graphical representation of full-wave simulated scattering parameters of the antenna element 10 of FIGS. 3A-3C when two ports are used. FIG. 5C is a graphical representation of full-wave simulated scattering parameters of the antenna element 10 of FIGS. 3A-3C when three ports are used. FIG. 5D is a graphical representation of full-wave simulated scattering parameters of the antenna element 10 of FIGS. 3A-3C when four ports are used.

When a single port is used, all the incident power couples to that antenna port P1 from free space (indicated as FS), as shown in FIG. 5A. As the number of ports increases, the incoming wave is equally split at the respective ports P1, P2, P3, P4 (FIGS. 5B-5D). Therefore, using the proposed design equal power splitting between the antenna ports P1, P2, P3, P4 is achieved in the limited space of the unit-cell, without using any bulky components (e.g., external power splitters). It is important to note that the phase difference between ports P1 and P4, and P2 and P3 is 180° since the mode fields have opposite directions (see FIG. 3A). Finally, the isolation between the different ports is always 3 decibels (dB) higher than the power splitting ratio.

III. Multi-Bit Unit-Cell Design

This section presents single- and multi-bit designs of the reconfigurable unit-cells according to embodiments described herein. As such, the patch antenna design presented in Section II (FIGS. 3A-3C) is integrated with an ideal switch with a delay line at each port, achieving multi-bit modulation on the reflected waves. The switches that could be integrated into such an antenna configuration are mmWave/THz SPST switches which are implemented using solid-state technologies (e.g., GaAs) and/or tunable two-dimensional (2D) materials, including graphene, molybdenum disulfide, vanadium dioxide, etc. The proposed design is compatible with shunt switching topologies, since mmWave/THz series switches are dominated by high-frequency parasitic effects.

A. Radiation Pattern of RRSs

The beam steering in reconfigurable surfaces is carried out by modulating the reflection phase of the impinging waves as mentioned in Section I. As such, the introduced phase modulation by a given antenna element 10 on the surface is determined using array theory. Namely, if it is assumed that a wave impinges on the linear reflective surface causing an illumination phase profile across the antennas, then the required element phase is given by:

$$\theta_{ele}(i) = \frac{2\pi}{\lambda_0} d(i-1) \sin(\theta_{des}) - \theta_{illum}(i) \quad \text{Equation 1}$$

where $\theta_{ele}(i)$ is the phase modulation required by each antenna element to steer the beam toward tides (the direction of the desired beam), $\theta_{illum}(i)$ is the phase profile of the impinging waves, d is the element spacing, and $\lambda_0$ is the free-space wavelength. In the case of an impinging plane-wave, the illumination phase profile is given by:

$$\theta_{ill}(i) = \frac{2\pi}{\lambda_0} d(i-1) \tan(\theta_{imp}) \quad \text{Equation 2}$$

where $\theta_{imp}$ is the direction of the impinging waves.

The phase profile, θ(i), calculated in Equation 1 consists of continuous values within the [−π, π] region, however, a limited number of phase bits are utilized by the reconfigurable array elements, thus the θ(i) profile is quantized based on the available bits. After the quantized phase profile, $\theta_{ele,q}(i)$, is calculated, the radiation pattern of the reconfigurable array is given by:

$$E(\theta) = E_{ele}(\theta) \sum_{1}^{N} e^{j\theta_{ele,q}(i)} e^{jkd(i-1)\sin(\theta)} A_{ill} e^{j\theta_{ill}(i)} \quad \text{Equation 3}$$

where $E_{ele}$ is the element factor, N is the number of elements across the linear array, $A_{ill}$ is the amplitude of the illumination beam at each element ($A_{ill}$ is constant for a single plane-wave illumination), and $\theta$ is the elevation angle measured from boresight.

B. SPST Switch with Integrated Delay Line

Figure 6A:
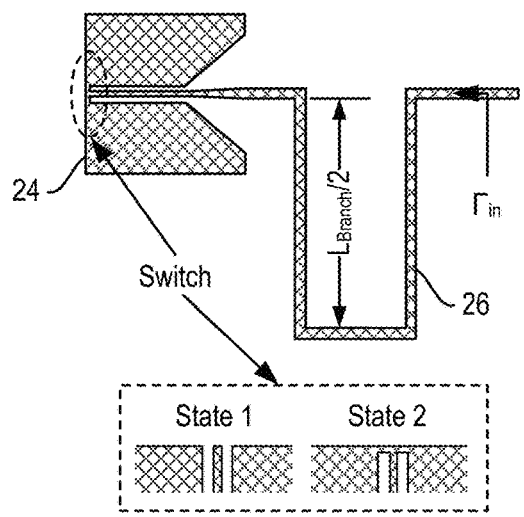
FIG. 6A is a schematic diagram of a single-bit coplanar waveguide (CPW) switch with a variable branch line.

FIG. 6A is a schematic diagram of a single-bit coplanar waveguide (CPW) switch 24 with a variable length microstrip branch line (e.g., a delay line 26). To modulate the reflected waves, at least one switch 24 needs to be integrated on each antenna element 10 of a reconfigurable surface. For an exemplary embodiment illustrated in FIG. 6A, an ideal switch 24 is leveraged consisting of a shunt perfect electric conductor (PEC). As such, when the PEC is shorting the signal and ground conductors of the CPW, the reflection coefficient is $\Gamma=-1$ (S.C.); on the contrary, in the absence of the PEC, the open-ended CPW is approximated by an open circuit, thus $\Gamma=1$ (O.C.).

Instead of the PEC, embodiments may use any 2D material that exhibits a tunable sheet resistance with a high ON/OFF ratio (e.g., vanadium dioxide) or a high-isolation SPST shunt switch (e.g., a diode, PIN diode, a microelectromechanical system (MEMS) switch, a transistor, etc.). To couple the signals from the coplanar-waveguide switch to the microstrip line, a via-less CPW to microstrip transition is implemented since mmWave/THz vias exhibit high parasitics and are avoided. Moreover, fabricating a via through a thick silicon substrate is a challenging task, due to the incorporated dry etching nanofabrication techniques.

Figure 6B:
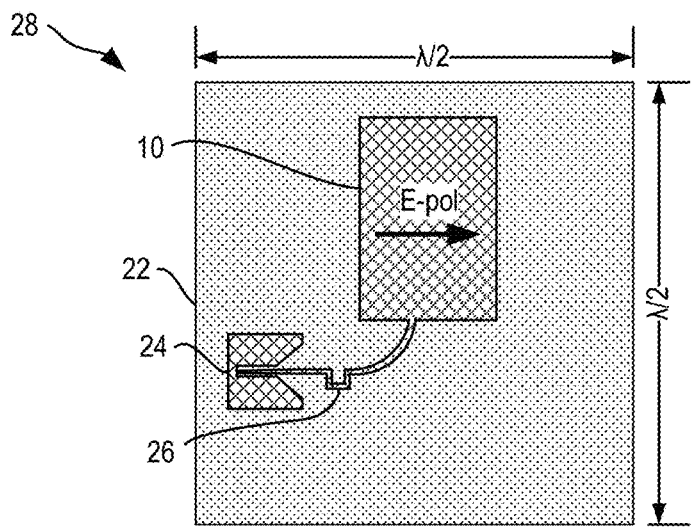
FIG. 6B is a schematic diagram of a single-bit unit-cell with the CPW switch of FIG. 6A.

FIG. 6B is a schematic diagram of a single-bit unit-cell 28 with the CPW switch 24 of FIG. 6A. As mentioned in Section I, to achieve multi-bit reconfiguration, each of the switches 24 requires an individual delay line 26 with respect to the antenna feeding point, thus a microstrip branch line is incorporated in the switch design. The goal of this delay line 26 is to shift the reference of the reflected signals as discussed in Section I (see FIGS. 2C-2E).

Figure 6C:
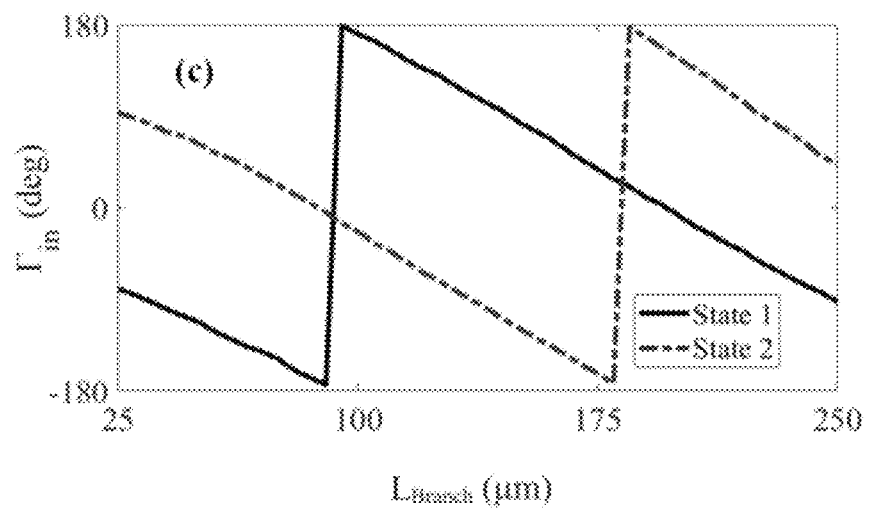
FIG. 6C is a graphical representation of a reflection phase of the CPW switch of FIG. 6A for various branch lengths at 275 gigahertz (GHz).

FIG. 6C is a graphical representation of a reflection phase of the CPW switch 24 of FIG. 6A for various branch lengths at 275 GHz. The reflection coefficient between the two states (O.C./S.C.) remains close to 180° as the branch length is scanned, however, their respective reference changes. The branch length is varied from 25 μm to 250 μm to achieve a full 360° shift in the reflection coefficient phase. Furthermore, the branch length minimum value is set to 25 μm, always accounting for the microstrip line corner effects on the propagated signals.

C. Single-Bit Configuration

The single-bit antenna configuration (e.g., the single-bit unit cell 28 of FIG. 6B) consists of the 1-port antenna element 10 with an integrated ideal switch 24 and a delay line 26 as described above. For an example embodiment discussed in this section, the branch length of the delay line 26 is 25 μm.

Figure 7A:
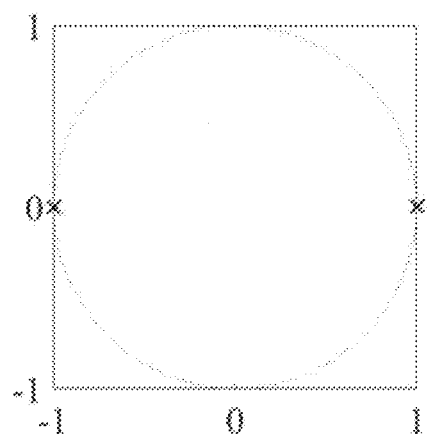
FIG. 7A is a constellation diagram of an ideal single-bit unit-cell.
Figure 7B:
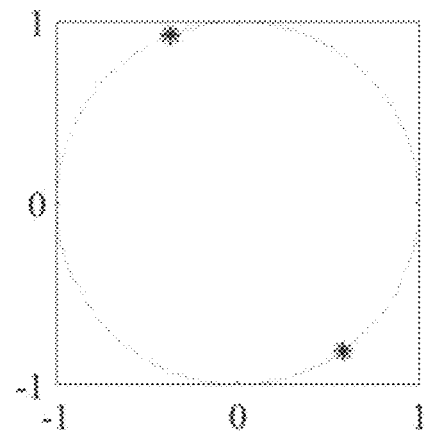
FIG. 7B is a constellation diagram of the single-bit unit-cell of FIG. 6B acquired with full-wave simulations.

FIG. 7A is a constellation diagram of an ideal single-bit unit-cell 28. FIG. 7B is a constellation diagram of the single-bit unit-cell 28 of FIG. 6B acquired with full-wave simulations. For the single-bit unit-cell 28 shown in FIG. 7B, the unit-cell reflection phase is −54° when the switch state is S.C. and 117° for the O.C. state, leading to a phase difference of 171°, close to the ideal 180° of FIG. 7A. The performance of the proposed single-bit unit-cell is defined by the ratio of the achieved phase difference (171°) over the ideal single-bit phase difference (180°), leading to a 95% ideality. The phase difference between the two states is not ideal since the open-ended CPW is not an ideal O.C. due to the effects of the parasitic capacitances in mmWave/THz frequencies.

Figure 7C:
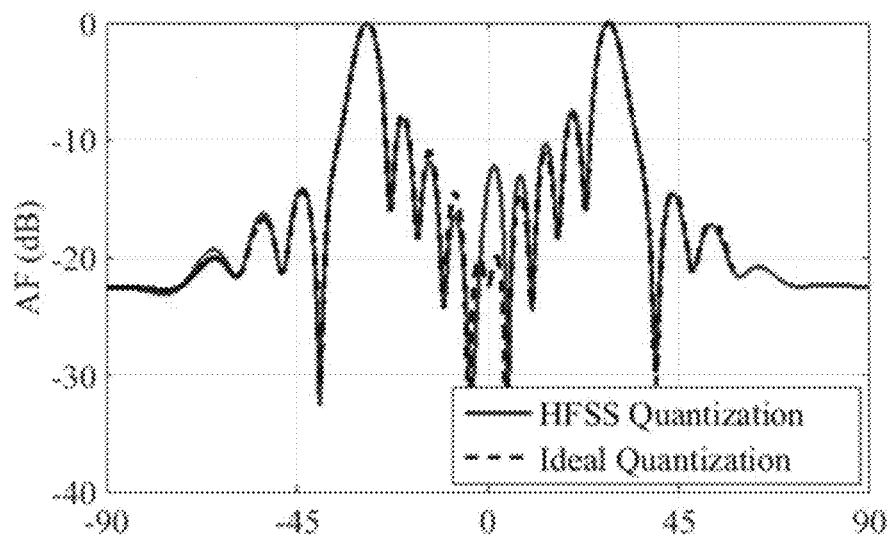
FIG. 7C is a graphical representation of a calculated E-plane radiation pattern of the single-bit unit-cell of FIG. 6B compared with an ideal pattern.

FIG. 7C is a graphical representation of a calculated E-plane radiation pattern of the single-bit unit-cell 28 of FIG. 6B compared with an ideal pattern. To validate the performance of the single-bit design, the radiation pattern is calculated using Equation 3 of a 21-element reflective surface (placed across E-plane with $\lambda_0/2$ spacing at 275 GHz) illuminated with a boresight E-polarized plane-wave ($\theta_{ill}(i)=0°$). In this example, the main beam is redirected toward 27°.

The calculated beampattern illustrated in FIG. 7C shows a good agreement between the proposed design and the ideal single-bit. As expected, in the case of a single-bit reflective surface (e.g., one using an array of single-bit unit-cells 28), the reflected beam is split between the desired direction and the secondary quantization lobe, due to quantization errors. The level of this secondary quantization lobe is the same as the main lobe since the impinging plane-wave causes a periodic phase distribution on the surface, thus leading to periodic quantization errors. Furthermore, when the illumination beam is a near field source (at the focal distance of the surface), the exponential phase profile of the illumination beam on the surface leads to multiple lower-level quantization lobes (instead of a single high-level). However, the efficiency of the reconfigurable surface remains low due to the number of available phase states. Therefore, single-bit reflective surfaces are an appropriate candidate for reflectarrays with near field illumination.

However, in cases where the source is at the far-field (e.g., communication relays such as large-intelligent-surfaces (LISs)), high-level quantization lobes would lead to undesirable interference and multipath propagation. Hence, as presented in the following sections the single-bit design is expanded to multi-bit configurations, eliminating quantization lobes and increasing aperture efficiency.

D. N-Bit Unit-Cell Design

This sub-section presents the multi-bit unit-cell designs that incorporate the ideal switch 24 with the delay line 26 into the multi-port antenna-splitter/combiner of Section II.

Figure 8A:
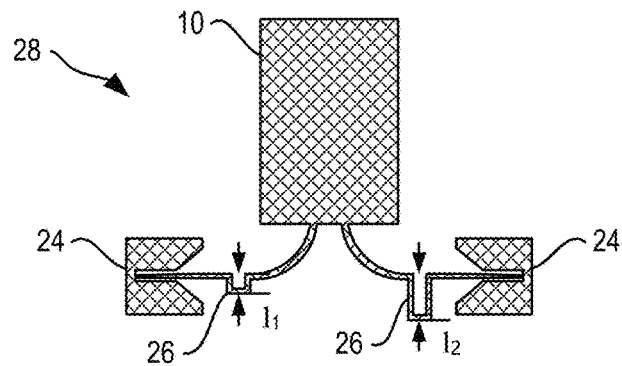
FIG. 8A is a schematic diagram of a two-bit unit-cell with two integrated single-pole-single-throw (SPST) ideal switches.

FIG. 8A is a schematic diagram of a two-bit unit-cell 28 with two integrated SPST ideal switches 24. The 2-bit unit-cell 28 consists of two ideal SPST switches 24 integrated at each port of the dual-feed antenna element 10. Varying the states of the two switches 24 between S.C. and O.C., four different phase states are acquired (i.e., 2 bits). The distribution of the four phase states along the unit-circle depends on the lengths of the two delay lines 26, since these control the required phase difference (see FIG. 1C and FIGS. 2B-2E).

Figure 8B:
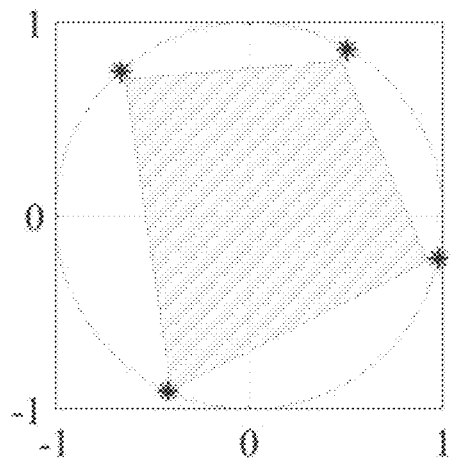
FIG. 8B is a constellation diagram of the two-bit unit-cell of FIG. 8A acquired with full-wave simulations.

FIG. 8B is a constellation diagram of the two-bit unit-cell 28 of FIG. 8A acquired with full-wave simulations. The multi-port antenna element 10 exhibits mutual coupling between the ports, altering the expected performance. Thus, to find the optimal reflection phase constellation diagram, the branch lengths of each switch are varied between 25-250 μm and the inscribed polygon area is observed (defined by the unit-cell's reflection coefficients as shown in FIG. 8B). When the area of the polygon is maximized, the phase states are equispaced, thus the ideal distribution is achieved.

Figure 2A:
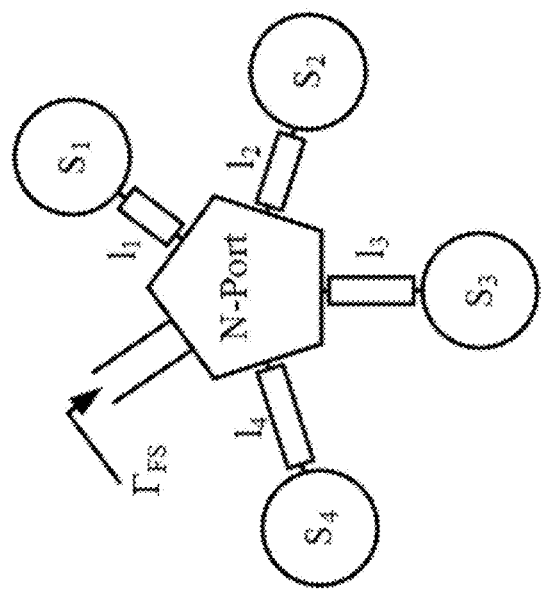
FIG. 2A is a schematic diagram of a multi-port antenna model for the shunt configuration.
Figure 2E:
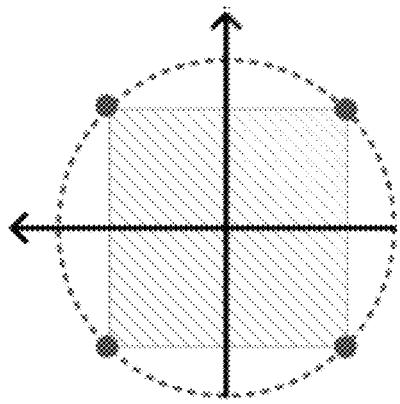
FIG. 2E is a constellation diagram of the 2-bit shunt unit-cell of FIG. 2B.
Figure 2D:
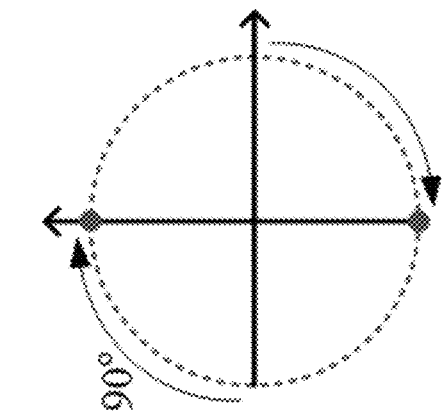
FIG. 2D is a constellation diagram of a second branch of the 2-bit shunt unit-cell of FIG. 2B.
Figure 2C:
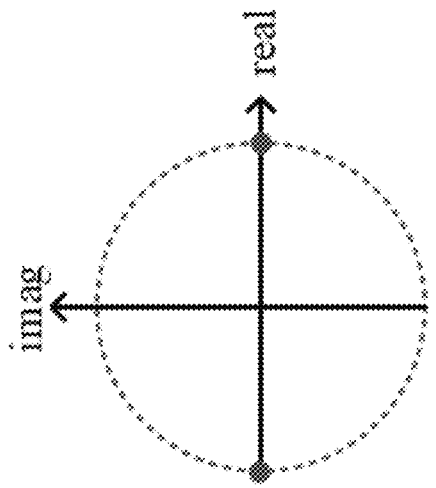
FIG. 2C is a constellation diagram of a first branch of the 2-bit shunt unit-cell of FIG. 2B.

This optimization was performed by mathematically combining the scattering parameter matrices of the multi-port antennas and the reflection coefficients of the ideal switches 24 with the delay lines 26, as depicted in FIG. 2A, since full-wave optimization is a computationally-intensive process. Delay branch lengths are constant, and the unit-cell reflection coefficients are acquired by modulating the two ideal switches between S.C. and O.C., leading to four different states. As shown in Table II, the ideality of the phase states distribution is 93% (for a 2-bit configuration) and is given by the ratio of the ideal polygon area (FIG. 2E) over the optimized polygon area (FIG. 8B).

TABLE II

Multi-Bit Unit-Cell
Branch Lengths and Ideality

| Configuration | Ideality |
|---|---|
| 1-bit | 95% |
| 2-bit | 93% |
| 3-bit | 95% |
| 4-bit | 97% |

Figure 8C:
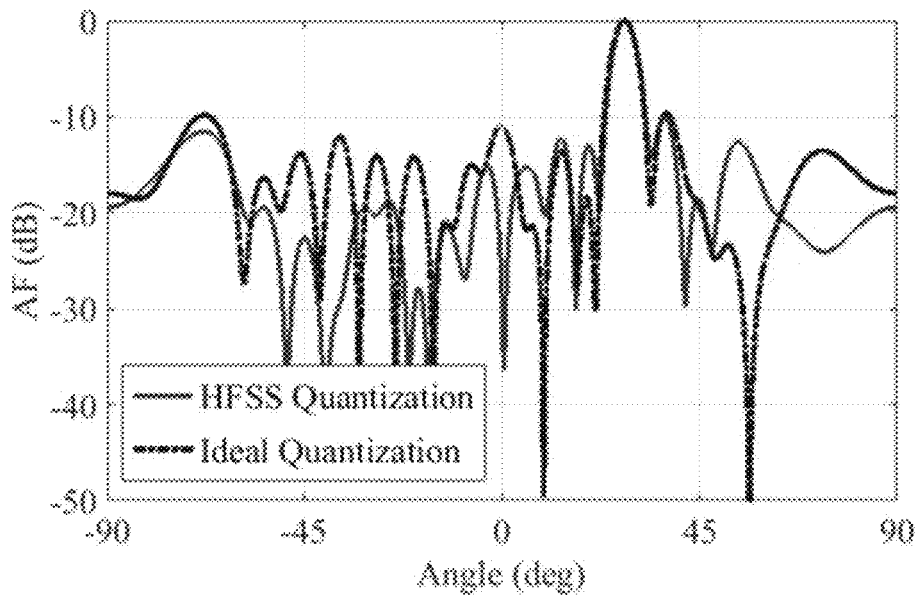
FIG. 8C is a graphical representation of a calculated E-plane radiation pattern of a 21-element array of the two-bit unit-cells of FIG. 8A compared with an ideal pattern.

FIG. 8C is a graphical representation of a calculated E-plane radiation pattern of a 21-element array of the two-bit unit-cells 28 of FIG. 8A compared with an ideal pattern. To test the performance of the proposed 2-bit unit-cell 28 in an array configuration, the same example is carried out as in the single-bit case (Section III-A), using a 21-element array ($\lambda_0/2$ spacing at 275 GHz) to redirect the impinging boresight E-polarized plane-wave toward 27°. The calculated radiation pattern using Equation 3 is presented alongside the radiation pattern of the ideal 2-bit. As clearly shown by the calculated radiation pattern, the performance of the proposed 2-bit design is in very good agreement with the ideal 2-bit configuration, in terms of main lobe size and direction, and maximum side-lobe level (SLL).

Similarly, 3- and 4-bit unit-cells 28 are devised by integrating ideal SPST switches 24 with different delay lines 26 at each port of the multi-port antenna element 10. Each of the single-bit switches 24 is tuned to S.C. or O.C. states, leading to 8 and 16 reflection phase states for the 3- and 4-bit unit-cells 28, respectively. The lengths of the delay lines 26 are optimized to acquire the maximum area of the inscribed circles (as in the 2-bit case). The ideal and achieved unit-cell reflection phase states (constellation diagram) for the 3- and 4-bit unit-cells are given in FIGS. 9A-9B and FIGS. 10A-10B, respectively.

Figure 9A:
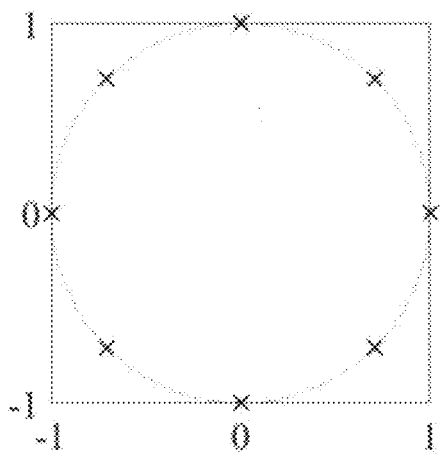
FIG. 9A is a constellation diagram of an ideal three-bit unit-cell.
Figure 9B:
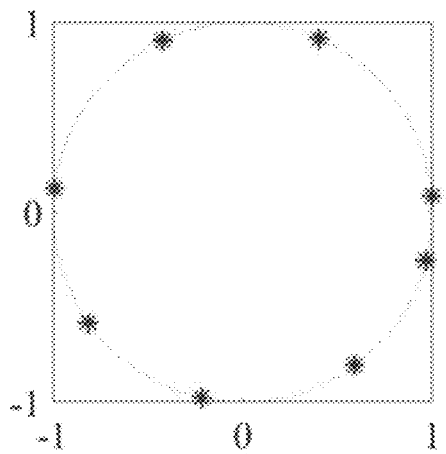
FIG. 9B is a constellation diagram of an optimal three-bit unit-cell acquired with full-wave simulations.
Figure 10A:
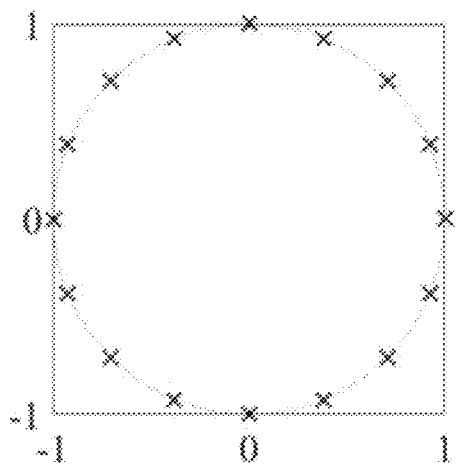
FIG. 10A is a constellation diagram of an ideal four-bit unit-cell.
Figure 10B:
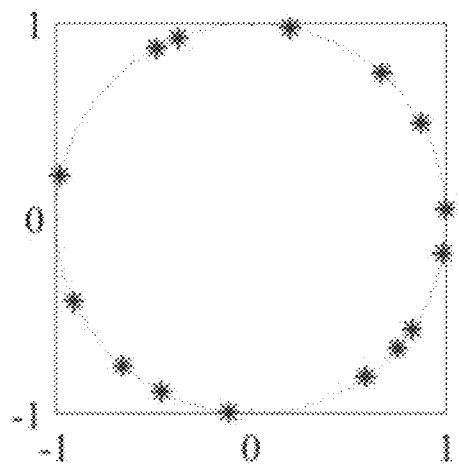
FIG. 10B is a constellation diagram of an optimal four-bit unit-cell acquired with full-wave simulations.

FIG. 9A is a constellation diagram of an ideal three-bit unit-cell 28. FIG. 9B is a constellation diagram of an optimal three-bit unit-cell 28 acquired with full-wave simulations. FIG. 10A is a constellation diagram of an ideal four-bit unit-cell 28. FIG. 10B is a constellation diagram of an optimal four-bit unit-cell 28 acquired with full-wave simulations.

The phase states exhibit some difference from the ideal cases since the mutual coupling between the ports could not be mitigated. Likewise, the ideality of the acquired constellation diagrams is computed by calculating the ratio of the inscribed area of the optimized polygon over the ideal, leading to a 95% and 97% ideality for the 3- and 4-bit unit-cells 28, respectively.

Figure 9C:
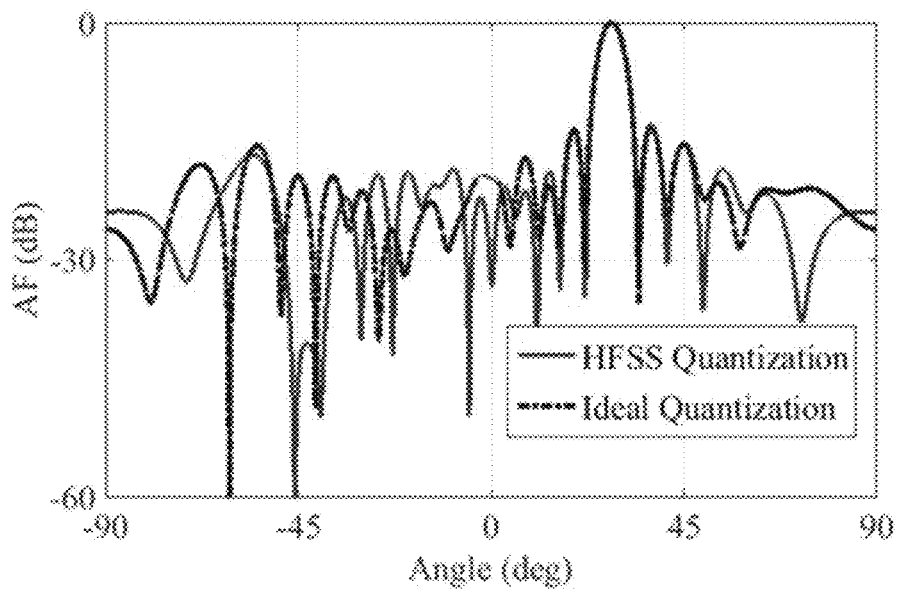
FIG. 9C is a graphical representation of a calculated E-plane radiation pattern of a 21-element array of three-bit unit-cells compared with an ideal pattern.
Figure 10C:
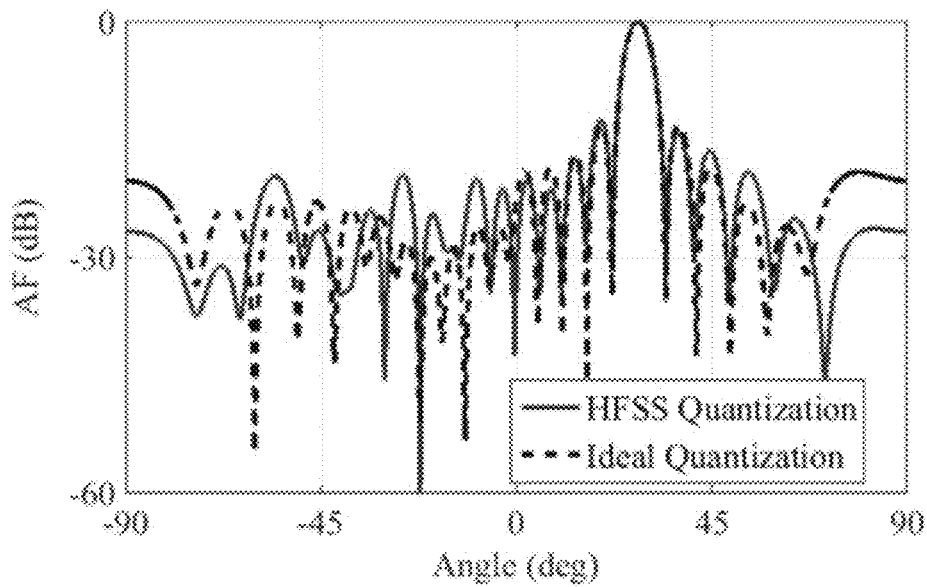
FIG. 10C is a graphical representation of a calculated E-plane radiation pattern of a 21-element array of four-bit unit-cells compared with an ideal pattern.

FIG. 9C is a graphical representation of a calculated E-plane radiation pattern of a 21-element array of three-bit unit-cells 28 compared with an ideal pattern. FIG. 10C is a graphical representation of a calculated E-plane radiation pattern of a 21-element array of four-bit unit-cells 28 compared with an ideal pattern. To validate the unit-cell designs, the radiation pattern is computed of a 21-element array ($\lambda_0/2$ spacing at 275 GHz) illuminated with a boresight E-polarized plane wave and redirecting the beams at 27°. As shown in FIGS. 9C and 10C, the radiation patterns of the ideal 3- and 4-bit configurations are in very good agreement with the proposed ones.

IV. Multi-Bit Array Design

The results presented in Section III concern the multi-bit unit-cells 28 and their performance, which was obtained by comparing the radiation patterns—calculated with Equation 3—between the proposed multi-bit designs and their ideal counterpart. However, when the antenna elements 10 are placed in an actual array configuration, the effects of surface waves and other mutual coupling mechanisms are expected to alter the performance. Thus, the 21-element arrays of the previous Section III are modeled in a full-wave finite element method (FEM) simulator. In this manner, all the exhibited phenomena of the array are captured, including the mutual coupling between the antenna elements.

Figure 11A:
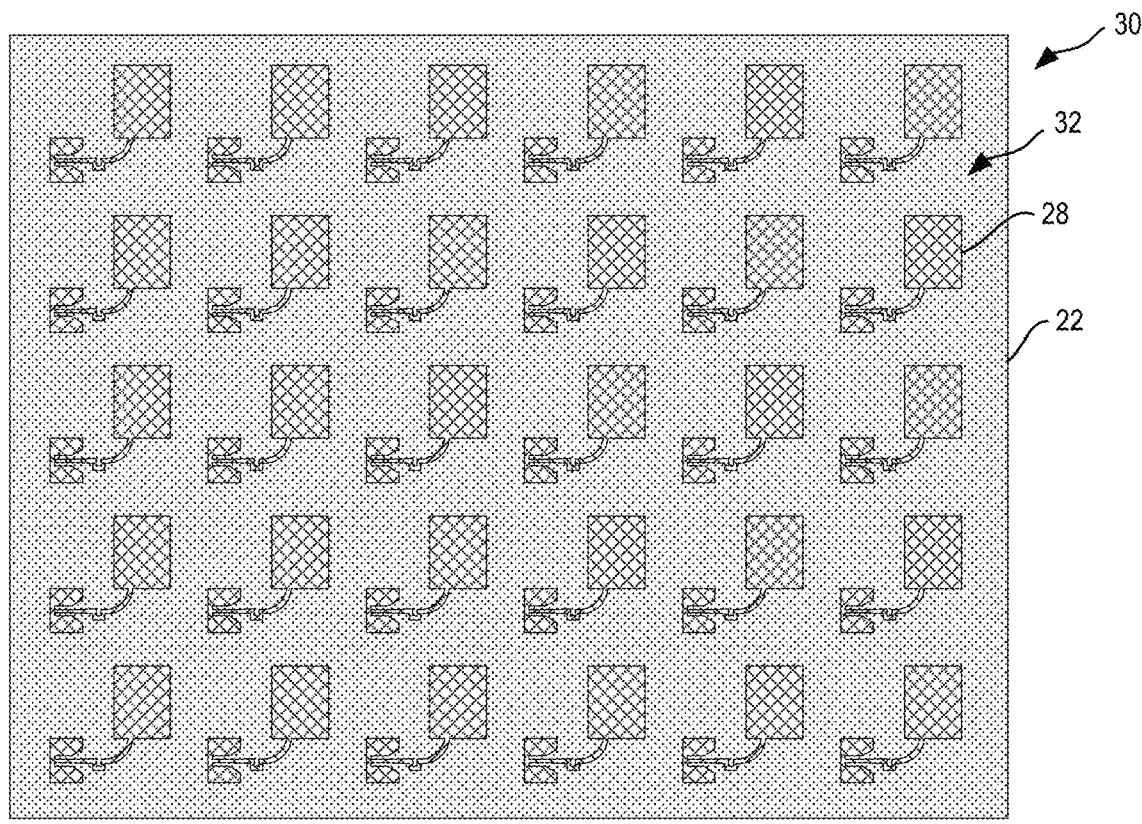
FIG. 11A is a schematic diagram of a RRS with an array of single-bit unit-cells.

FIG. 11A is a schematic diagram of a RRS 30 with an array 32 of single-bit unit-cells 28. The unit-cells 28 can be disposed over a common substrate 22, which may be a semiconductor substrate on which the switches 24, antenna elements 10, and delay lines 26 described with respect to FIG. 6B are formed. The RRS 30 can be an ultra low-power device or an energy independent device (e.g., incorporating a battery, wireless power harvesting system, solar cell, etc.).

Figure 11B:
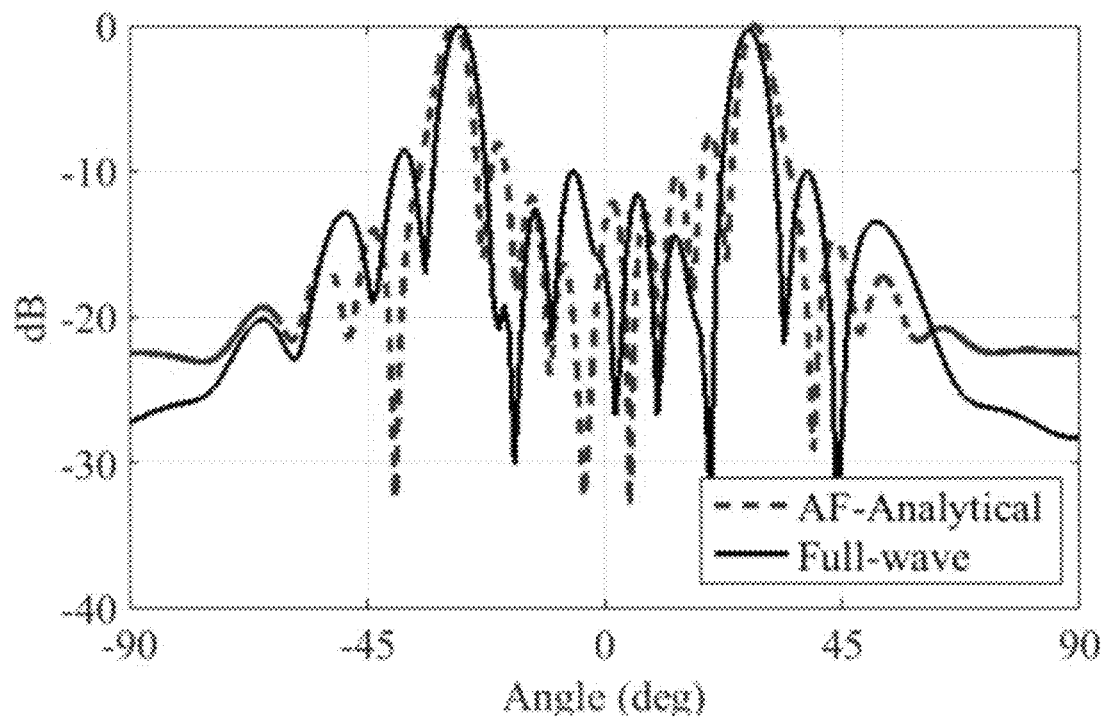
FIG. 11B is a graphical representation of a full-wave E-plane radiation pattern of an embodiment of the RRS of FIG. 11A at its center frequency compared with the calculated pattern.

FIG. 11B is a graphical representation of a full-wave E-plane radiation pattern of an embodiment of the RRS 30 of FIG. 11A at its center frequency compared with the calculated pattern. In this example (as well as FIGS. 12B, 13C, and 14C), the array 32 includes 21 unit-cells 28, though the number of unit-cells 28 may be more or less depending on application.

Figure 12A:
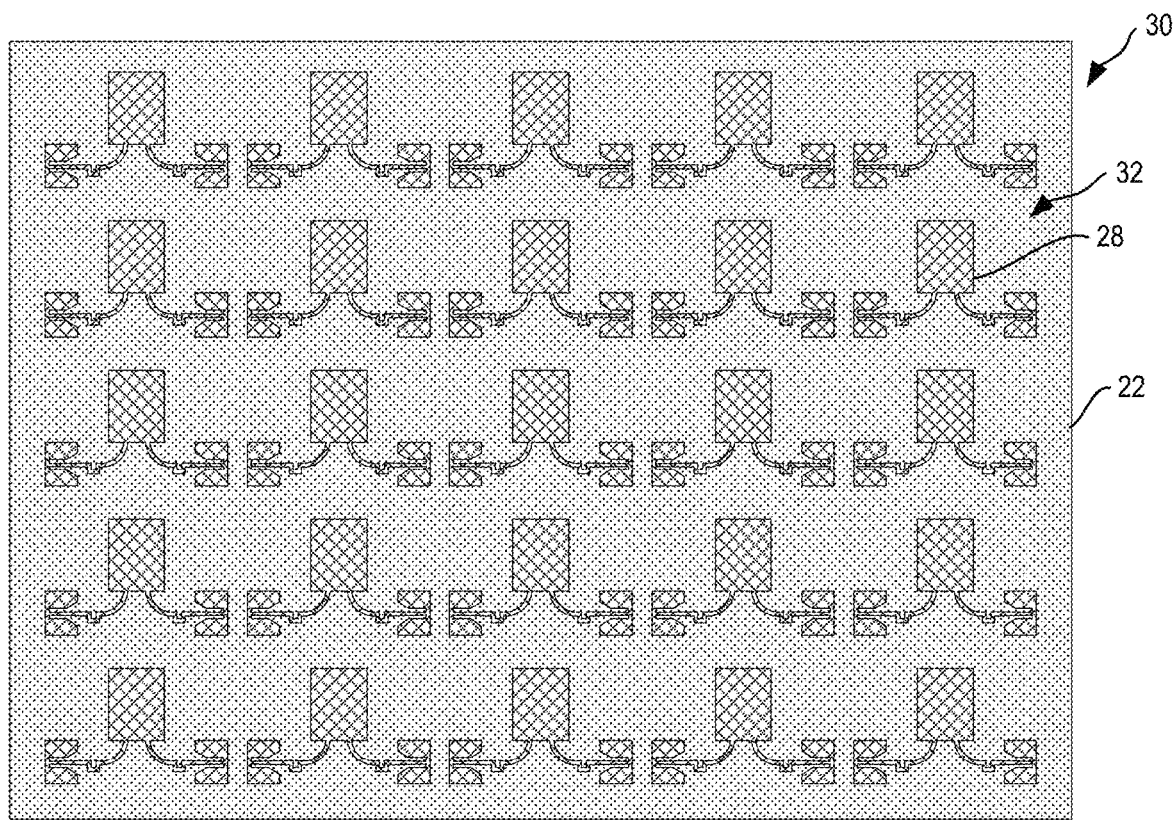
FIG. 12A is a schematic diagram of a RRS with an array of two-bit unit-cells.
Figure 12B:
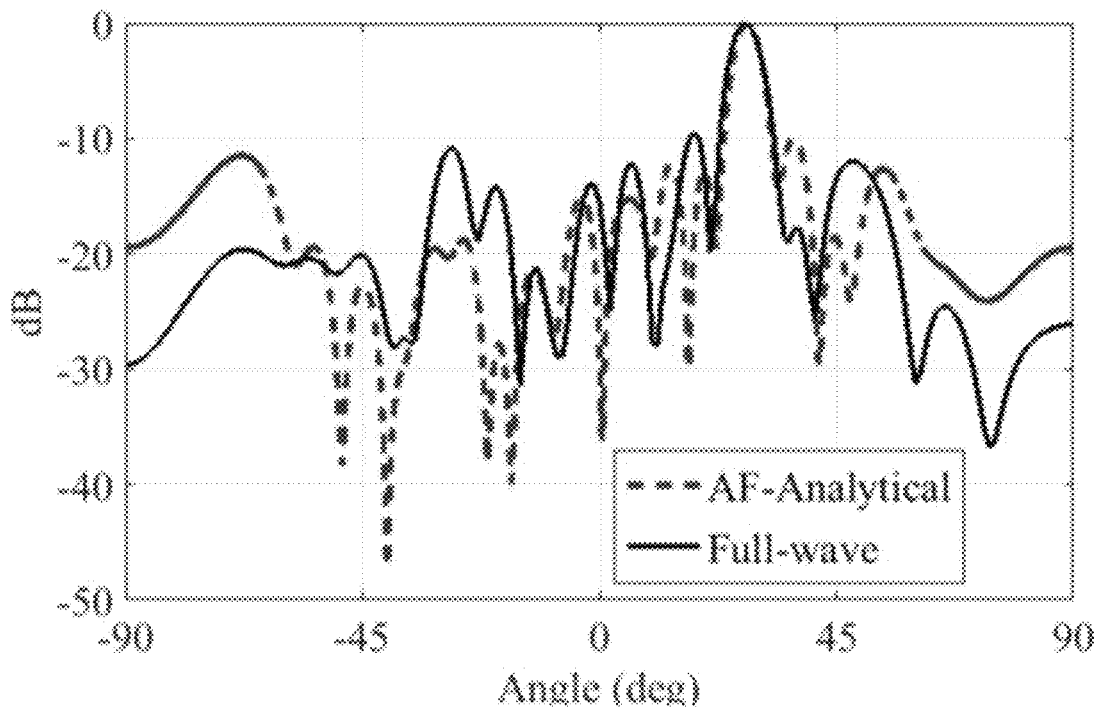
FIG. 12B is a graphical representation of an embodiment of the RRS of FIG. 12A at its center frequency compared with the calculated pattern.

FIG. 12A is a schematic diagram of a RRS 30 with an array 32 of two-bit unit-cells 28. FIG. 12B is a graphical representation of an embodiment of the RRS 30 of FIG. 12A at its center frequency compared with the calculated pattern.

Figure 13A:
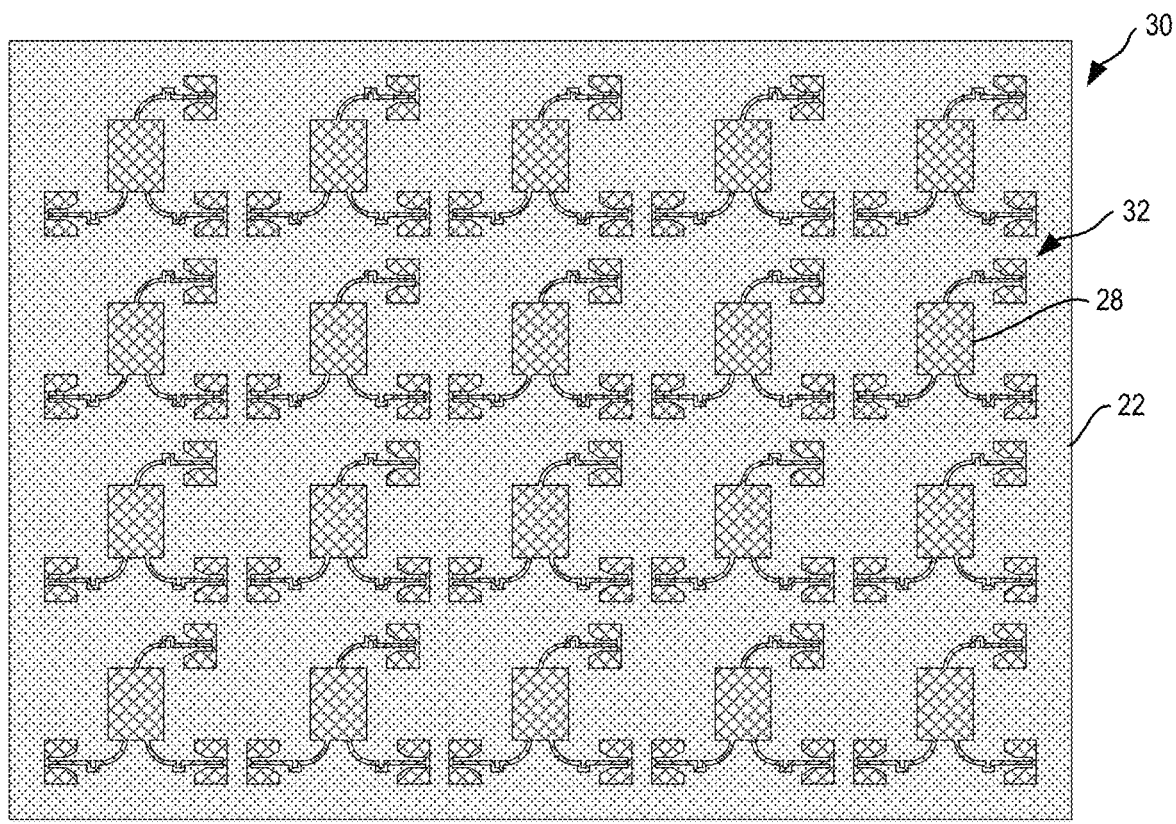
FIG. 13A is a schematic diagram of a RRS with an array of three-bit unit-cells.
Figure 13B:
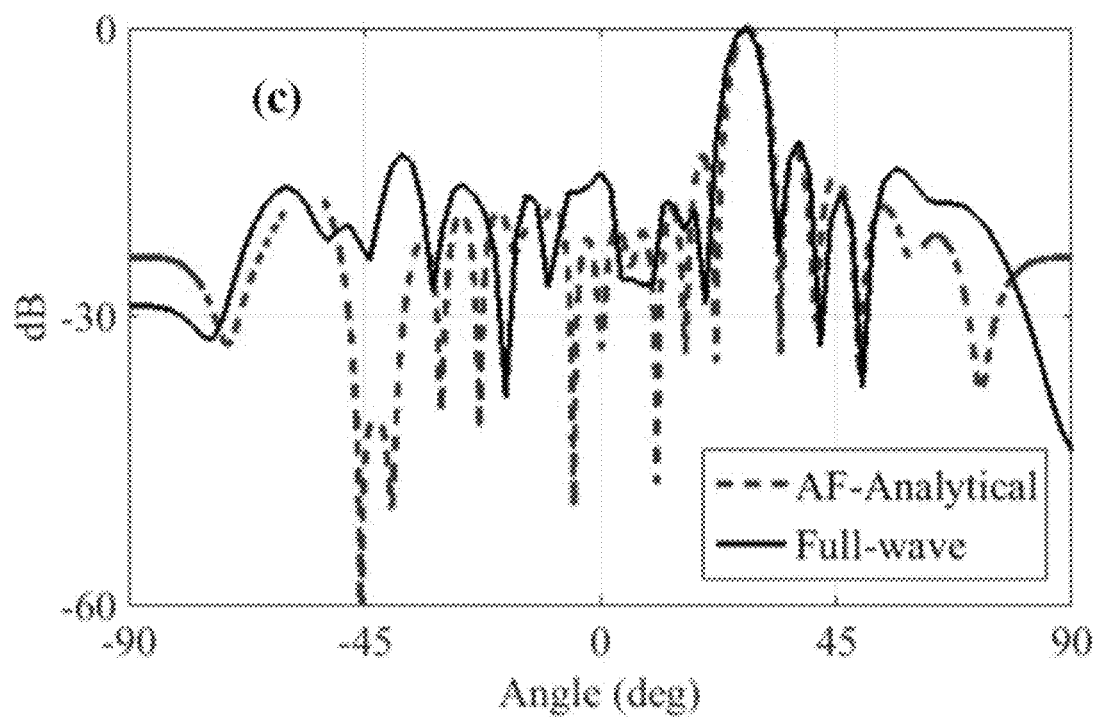
FIG. 13B is a graphical representation of an embodiment of the RRS of FIG. 13A at its center frequency compared with the calculated pattern.

FIG. 13A is a schematic diagram of a RRS 30 with an array 32 of three-bit unit-cells 28. FIG. 13B is a graphical representation of an embodiment of the RRS 30 of FIG. 13A at its center frequency compared with the calculated pattern.

Figure 14A:
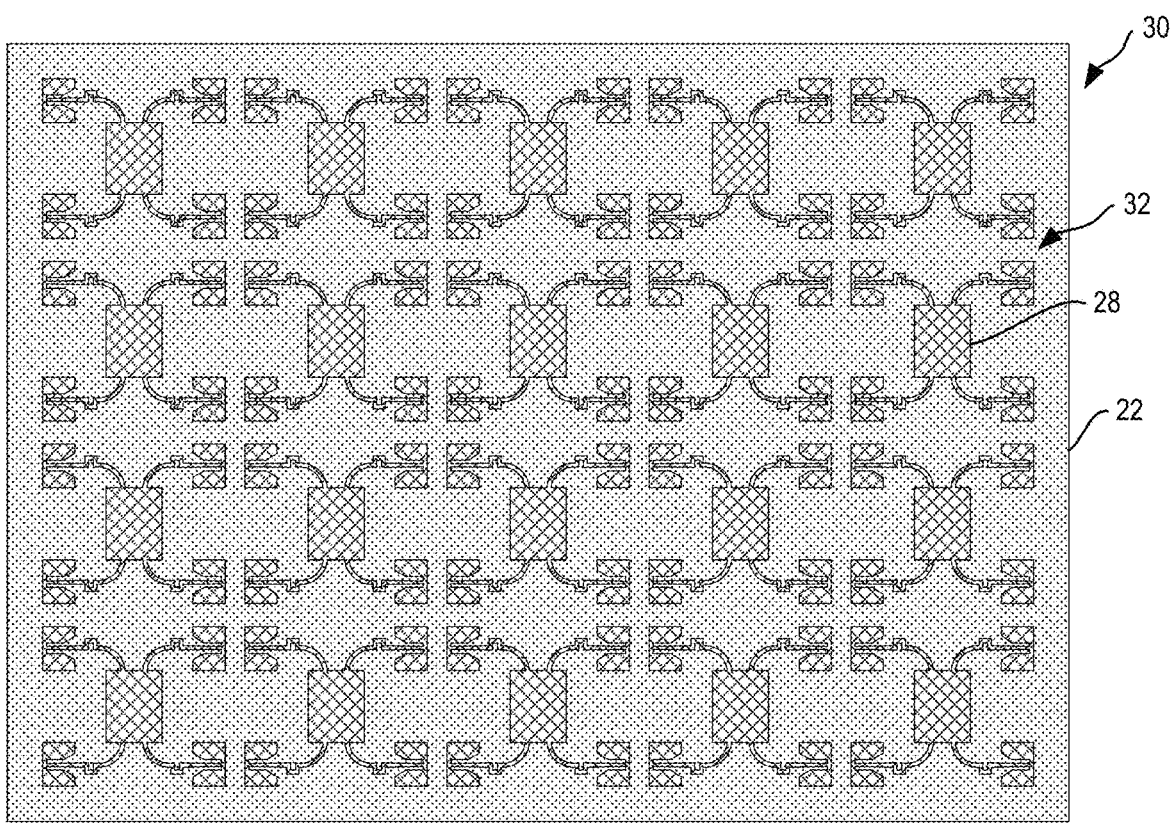
FIG. 14A is a schematic diagram of a RRS with an array of four-bit unit-cells.
Figure 14B:
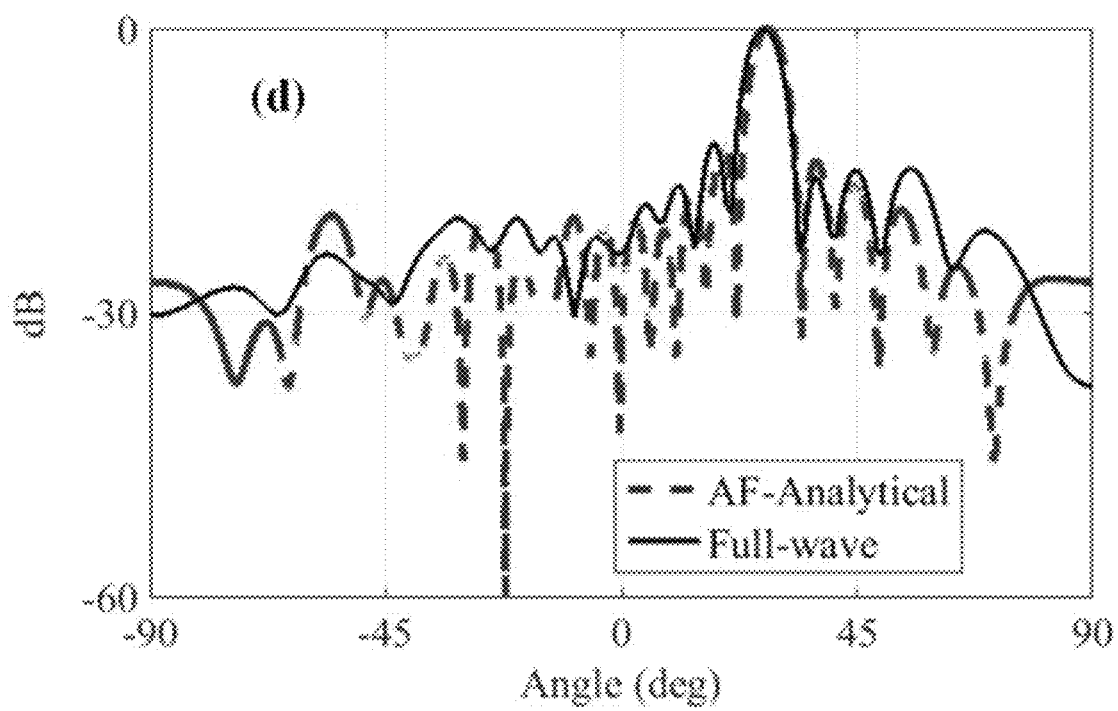
FIG. 14B is a graphical representation of an embodiment of the RRS of FIG. 14A at its center frequency compared with the calculated pattern.

FIG. 14A is a schematic diagram of a RRS 30 with an array 32 of four-bit unit-cells 28. FIG. 14B is a graphical representation of an embodiment of the RRS 30 of FIG. 14A at its center frequency compared with the calculated pattern.

As clearly shown by FIGS. 11B, 12B, 13B, and 14B, Equation 3 is accurately capturing the shape of the main lobe and the maximum SLL, but the sidelobe positions and shape differ since the coupling between the neighboring antennas slightly alters the surface fields.

Figure 15:
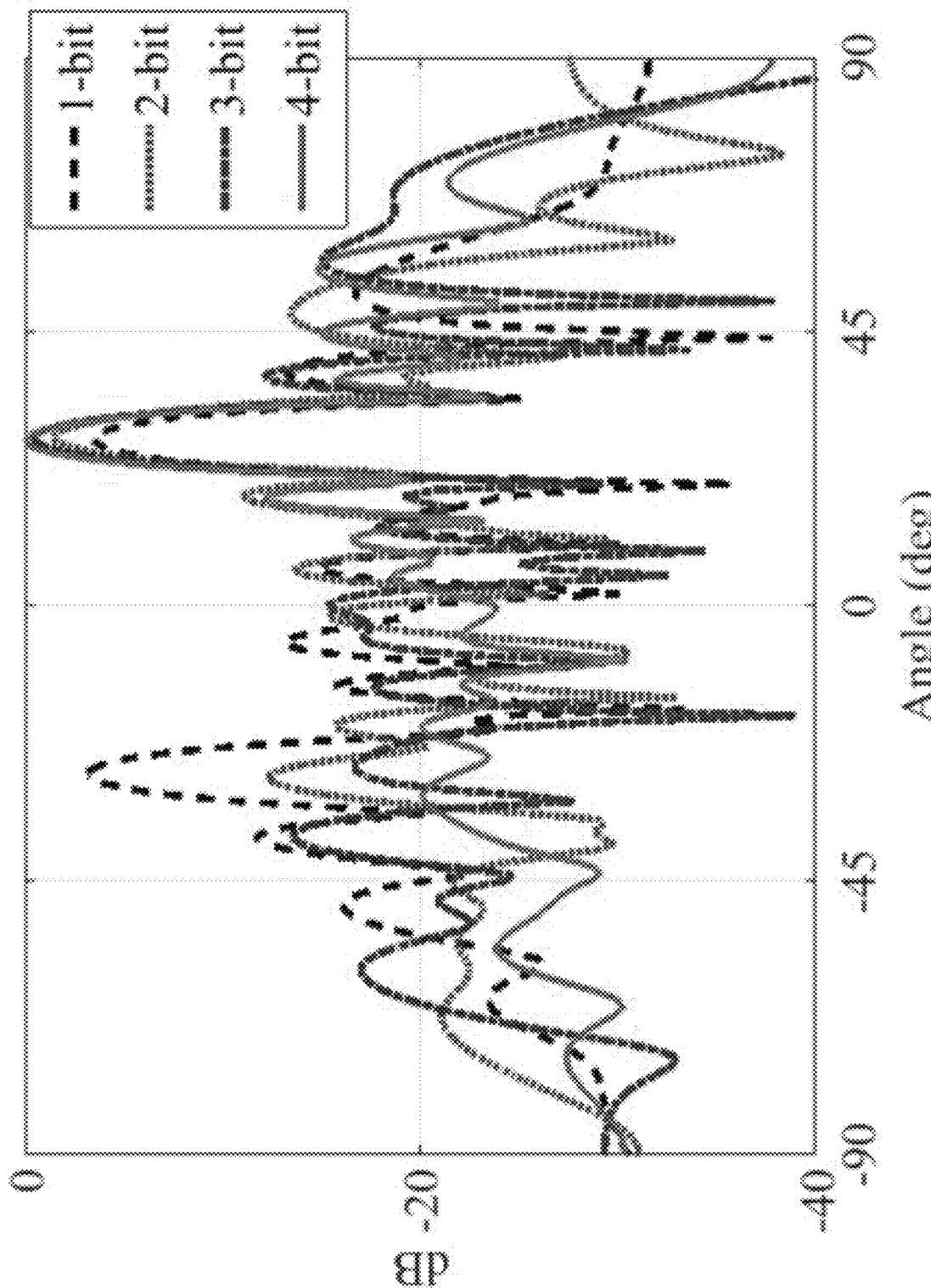
FIG. 15 is a graphical representation of the full-wave E-plane radiation pattern of 21-element arrays of single-bit, two-bit, three-bit, and four-bit unit-cells normalized to a maximum gain of the four-bit design.

FIG. 15 is a graphical representation of the full-wave E-plane radiation pattern of 21-element arrays of single-bit, two-bit, three-bit, and four-bit unit-cells normalized to a maximum gain of the four-bit design. As expected, the greater the number of bits, the smaller the quantization errors, leading to higher gain and smaller SLL level. The simulated aperture efficiencies ($e_{ap,sim}$) of these arrays are given in Table III, alongside the calculated ones ($e_{ap,calc}$) using Equation 3. As such, the simulated aperture efficiency is slightly reduced compared to the one calculated using Equation 3. However, as the number of bits increases, both the calculated and simulated efficiencies increase, as expected.

TABLE III

Multi-Bit Arrays Performance

| Configuration | $e_{ap, calc}$ | $e_{ap, sim}$ |
|---|---|---|
| 1-bit | 0.41 | 0.36 |
| 2-bit | 0.71 | 0.69 |
| 3-bit | 0.93 | 0.92 |
| 4-bit | 0.98 | 0.96 |

All the aforementioned results and discussions concern particular exemplary center frequencies of the simulated arrays; however, all antenna systems are required to exhibit a reasonable performance over a specific bandwidth (BW) both for imaging and communication applications. The simulated designs are implemented on a high-resistivity (>20,000 killiohm-centimeters (kΩ·cm)) silicon substrate ($\varepsilon_r$=11.9) and with a 20-micrometer thickness (h=20 μm). Such substrates are common in mmWave/THz bands and are typically fabricated using silicon-on-insulator (SOI) wafers. However, the use of a thin silicon substrate reduces the 10 dB BW of the patch antenna close to 1.5%. On the other hand, the designed patch antennas are not used only as receivers or transmitters, but as single/multi-port power splitters/combiners (FIG. 5). Thus, the regular BW definition should be replaced and expressed in terms of radiation characteristics. As such, the BW of the devices are defined as the frequency range in which the SLL is below −10 dB, while the impinging waves are redirected at the desired angle.

FIG. 16A is a graphical representation of the E-plane radiation pattern as a function of frequency of the RRS with single-bit unit-cells. FIG. 16B is a graphical representation of the E-plane radiation pattern as a function of frequency of the RRS with two-bit unit-cells. FIG. 16C is a graphical representation of the E-plane radiation pattern as a function of frequency of the RRS with three-bit unit-cells. FIG. 16D is a graphical representation of the E-plane radiation pattern as a function of frequency of the RRS with four-bit unit-cells. The frequency range in which the SLL remains below −10 dB is denoted. As such, the BW of the proposed multi-bit reflective arrays slightly reduces as the number of bits increases. This is explained by observing FIG. 5, where the power splitting BW between the multiple antenna ports is inversely proportional to the number of bits.

Moreover, the phase delay introduced by the different branches at each port is frequency-dependent, leading to alterations in reflection phase constellation diagrams of the unit-cells, further affecting the BW performance. In exemplary simulated results, a reduction is observed in the fractional BW versus the number of utilized bits. Moreover, the center frequency of the designs is slightly shifted when modeled in the full-wave simulator due to mutual coupling effects, hence in some embodiments optimization is performed to align the center frequencies taking fabrication into consideration.

V. Discussion

The proposed multi-bit configurations could be used in reflectarrays (near-field illumination) and reflective surfaces (e.g., LISs) (far-field illumination). Moreover, the presented designs can be extended to other frequency bands, including microwaves, where multi-bit reconfigurable surfaces are usually implemented with varactors that require high biasing voltages and complex biasing networks compared with PIN diodes. Furthermore, the proposed multi-bit approach could be implemented using other cavity-based antennas including dielectric resonators commonly used in optical frequencies, leading to reconfigurable mirrors in the far-infrared and visible range.

Additionally, the switch topology used herein is an ideal O.C/S.C switch; this approach is representative of some novel 2D tunable materials (e.g., vanadium dioxide and molybdenum disulfide), where the sheet resistance ratio between the tunable states is more than 1,000. Similarly to these tunable materials, other switching configurations could be exploited that have low losses (e.g., less than 1 dB) and are implemented with traditional solid-state technologies. In the case of lossy switches (e.g., graphene), the performance of the multi-bit configurations is expected to decline.

Furthermore, the feeding approach proposed herein could be altered to fit the needs of other systems that require densely populated apertures (e.g., less than $\lambda_0/2$). For example, to reduce the footprint of the antenna-splitter/combiner, the feeding could be carried out from the ground plane using aperture coupling techniques. However, the coplanar feeding approach is preferred in embodiments disclosed herein, since the use of aperture coupling is a challenging task with the use of thin wafers due to the required multiple layered substrates.

Finally, the disclosed embodiments are the only ones that can achieve 4-bit reconfiguration of the reflected waves with a single switch-per-bit constraint. Moreover, the scalability of existing multi-bit designs toward increasing the number of bits is not as straightforward as the one presented herein.

Those skilled in the art will recognize improvements and modifications to the preferred embodiments of the present disclosure. All such improvements and modifications are considered within the scope of the concepts disclosed herein and the claims that follow.

What is claimed is:

1. A reconfigurable reflective antenna device, comprising:
an antenna element comprising a first port, a second port, and a third port, wherein the antenna element is configured as a splitter/combiner;
a first switch coupled to the first port and configured to provide a first control bit for the antenna element;
a second switch coupled to the second port and configured to provide a second control bit for the antenna element; and
a third switch coupled to the third port and configured to provide a third control bit for the antenna element;
a first delay line between the first port and the first switch, wherein the first delay line provides a first phase shift of a signal impinging on the antenna element when the first switch is closed;
a second delay line between the second port and the second switch, wherein the second delay line provides a second phase shift of the signal impinging on the antenna element when the second switch is closed; and
a third delay line between the third port and the third switch, wherein the third delay line provides a third phase shift of the signal impinging on the antenna element when the third switch is closed.

2. The reconfigurable reflective antenna device of claim 1, further comprising a fourth switch coupled to a fourth port of the antenna element and configured to provide a fourth control bit.

3. The reconfigurable reflective antenna device of claim 1, wherein each of the first control bit, the second control bit, and the third control bit provides a binary control of at least one of a phase or a magnitude of the signal impinging on the antenna element.

4. The reconfigurable reflective antenna device of claim 1, wherein the first port and the second port are positioned on a first end of the antenna element.

5. The reconfigurable reflective antenna device of claim 4, wherein the third port is positioned on a second end of the antenna element opposite the first end.

6. The reconfigurable reflective antenna device of claim 1, further comprising:
   a fourth switch coupled to a fourth port of the antenna element and configured to provide a fourth control bit; and
   a fourth delay line between the fourth port and the fourth switch, wherein the fourth delay line provides a fourth phase shift of the signal impinging on the antenna element when the fourth switch is closed.

7. The reconfigurable reflective antenna device of claim 6, wherein each of the first delay line, the second delay line, the third delay line, and the fourth delay line provides equispaced phase states.

8. The reconfigurable reflective antenna device of claim 1, wherein each of the first switch, the second switch, and the third switch is a single-pole-single-throw (SPST) switch.

9. The reconfigurable reflective antenna device of claim 8, wherein each of the first switch, the second switch, and the third switch is a PIN diode.

10. A multi-bit reconfigurable reflective surface, comprising:
    an array of unit-cells, each unit-cell comprising:
        a multi-port antenna element; and
        a plurality of switches, each switch coupled to a port of the multi-port antenna element;
    a controller coupled to the array of unit-cells and configured to provide a control signal providing a single control bit per each of the plurality of switches to steer an electromagnetic wave impinging on the multi-port antenna element in each of the array of unit-cells;
    wherein each unit-cell further comprises a delay line between each port of the multi-port antenna element and a corresponding switch of the plurality of switches;
    wherein the control signal steers the electromagnetic wave by adjusting phase states of each multi-port antenna element in the array of unit-cells; and
    wherein a length of each delay line is optimized to substantially equispace the phase states of each multi-port antenna element in the array of unit-cells.

11. The multi-bit reconfigurable reflective surface of claim 10, wherein the multi-port antenna element in each of the array of unit-cells is a patch antenna.

12. The multi-bit reconfigurable reflective surface of claim 11, wherein each port of the multi-port antenna element in the array of unit-cells is edge fed.

13. The multi-bit reconfigurable reflective surface of claim 10, wherein each of the plurality of switches in the array of unit-cells comprises at least one of a diode, a PIN diode, a MEMS switch, a transistor, or a tunable 2-dimensional (2D) material.

14. The multi-bit reconfigurable reflective surface of claim 10, wherein the multi-bit reconfigurable surface is energy independent.

15. The multi-bit reconfigurable reflective surface of claim 14, further comprising a wireless power harvesting system.

* * * * *